(12) United States Patent
Rose et al.

(10) Patent No.: US 8,762,194 B2
(45) Date of Patent: Jun. 24, 2014

(54) SYSTEMS AND METHODS FOR EVALUATING ALTERNATIVE FINANCIAL PRODUCTS

(75) Inventors: David T. Rose, Cumming, GA (US); Donald Henry Hopper, Jr., Stone Mountain, GA (US); Kejun Zhang, Atlanta, GA (US)

(73) Assignee: Fiserv, Inc., Brookfield, WI (US)

( * ) Notice: Subject to any disclaimer, the term of this patent is extended or adjusted under 35 U.S.C. 154(b) by 0 days.

(21) Appl. No.: 13/407,102

(22) Filed: Feb. 28, 2012

(65) Prior Publication Data

US 2013/0226828 A1 Aug. 29, 2013

(51) Int. Cl.
*G06Q 10/00* (2012.01)
*G06Q 30/00* (2012.01)

(52) U.S. Cl.
USPC .......................... 705/7.31; 705/7.29; 705/35

(58) Field of Classification Search
USPC .......................... 705/7.29, 7.31, 35
See application file for complete search history.

(56) References Cited

U.S. PATENT DOCUMENTS

| | | | |
|---|---|---|---|
| 6,196,458 B1 | 3/2001 | Walker et al. | |
| 6,321,205 B1 | 11/2001 | Eder | |
| 6,321,206 B1 * | 11/2001 | Honarvar | 705/7.33 |
| 6,405,173 B1 * | 6/2002 | Honarvar et al. | 705/7.36 |
| 6,658,393 B1 | 12/2003 | Basch et al. | |
| 6,694,300 B1 | 2/2004 | Walker et al. | |
| 6,708,155 B1 | 3/2004 | Honarvar et al. | |
| 6,725,210 B1 | 4/2004 | Key et al. | |
| 7,062,463 B2 | 6/2006 | Knapp | |
| 7,117,208 B2 | 10/2006 | Tamayo et al. | |
| 7,165,037 B2 | 1/2007 | Lazarus et al. | |
| 7,296,734 B2 * | 11/2007 | Pliha | 235/379 |
| 7,376,603 B1 * | 5/2008 | Mayr et al. | 705/35 |
| 7,403,904 B2 | 7/2008 | Abe et al. | |
| 7,519,553 B2 | 4/2009 | Abe et al. | |
| 7,552,069 B2 | 6/2009 | Kepecs | |
| 7,580,856 B1 | 8/2009 | Pliha | |
| 7,610,257 B1 | 10/2009 | Abrahams | |
| 7,617,156 B1 | 11/2009 | Wolfson | |
| 7,720,761 B2 | 5/2010 | Trench et al. | |
| 7,752,100 B1 | 7/2010 | Wasserman et al. | |
| 7,813,951 B2 * | 10/2010 | Eskandari | 705/7.31 |
| 7,813,952 B2 * | 10/2010 | Eskandari | 705/7.31 |
| 7,813,983 B2 | 10/2010 | Wottowa et al. | |
| 7,814,019 B2 | 10/2010 | Knapp | |

(Continued)

OTHER PUBLICATIONS

Final Office Action for related U.S. Appl. No. 13/237,583 mailed Jul. 18, 2013.

(Continued)

*Primary Examiner* — Sara C Hamilton
(74) *Attorney, Agent, or Firm* — Sutherland Asbill & Brennan LLP

(57) ABSTRACT

Systems and methods for evaluating alternative financial products are provided. A first financial product offered by a financial institution may be identified, where one or more customers of the financial institution are eligible for migration from a second financial product to the first financial product. An attrition risk associated with migration of the one or more customers to the first financial product may be determined. If the attrition risk satisfies a threshold, then migration of the one or more customers to the first financial product may be directed. Otherwise, if the attrition risk fails to satisfy the threshold, then one or more characteristics associated with the first financial product may be modified.

30 Claims, 6 Drawing Sheets

(56) References Cited

U.S. PATENT DOCUMENTS

| | | | |
|---|---|---|---|
| 7,831,467 B1* | 11/2010 | Lefebvre et al. | 705/14.1 |
| 7,840,428 B2* | 11/2010 | McNab et al. | 705/7.11 |
| 7,962,406 B2 | 6/2011 | Bishop et al. | |
| 7,996,307 B2 | 8/2011 | Bishop et al. | |
| 8,005,777 B1 | 8/2011 | Owen et al. | |
| 8,073,767 B1 | 12/2011 | Trench et al. | |
| 8,099,356 B2 | 1/2012 | Feinstein et al. | |
| 8,140,399 B1* | 3/2012 | Goel | 705/26.1 |
| 8,145,535 B2* | 3/2012 | Goel | 705/26.1 |
| 8,145,536 B1* | 3/2012 | Goel | 705/26.1 |
| 8,165,920 B2* | 4/2012 | Goel | 705/26.1 |
| 8,194,830 B2* | 6/2012 | Chakraborty et al. | 379/112.01 |
| 8,199,901 B2* | 6/2012 | Rani et al. | 379/265.03 |
| 8,249,231 B2* | 8/2012 | Chakraborty et al. | 379/112.01 |
| 8,285,596 B2* | 10/2012 | Sharma | 705/26.1 |
| 8,688,557 B2 | 4/2014 | Rose et al. | |
| 2002/0023051 A1 | 2/2002 | Kunzle et al. | |
| 2002/0116244 A1* | 8/2002 | Honarvar et al. | 705/7 |
| 2002/0194096 A1 | 12/2002 | Falcone et al. | |
| 2002/0194117 A1* | 12/2002 | Nabe et al. | 705/38 |
| 2003/0200135 A1* | 10/2003 | Wright | 705/10 |
| 2004/0034558 A1 | 2/2004 | Eskandari | |
| 2004/0039593 A1* | 2/2004 | Eskandari | 705/1 |
| 2004/0073520 A1* | 4/2004 | Eskandari | 705/400 |
| 2004/0093271 A1 | 5/2004 | Walker et al. | |
| 2004/0111363 A1 | 6/2004 | Trench et al. | |
| 2004/0139010 A1 | 7/2004 | McMichael et al. | |
| 2004/0193537 A1 | 9/2004 | Knapp | |
| 2005/0021456 A1 | 1/2005 | Steele et al. | |
| 2005/0097028 A1* | 5/2005 | Watanabe et al. | 705/37 |
| 2005/0273430 A1* | 12/2005 | Pliha | 705/42 |
| 2005/0279824 A1 | 12/2005 | Anderson et al. | |
| 2007/0106558 A1 | 5/2007 | Mitchell et al. | |
| 2007/0124237 A1 | 5/2007 | Sundararajan et al. | |
| 2007/0156673 A1 | 7/2007 | Maga et al. | |
| 2007/0159481 A1 | 7/2007 | Abe et al. | |
| 2007/0185867 A1 | 8/2007 | Maga et al. | |
| 2007/0203827 A1 | 8/2007 | Simpson et al. | |
| 2008/0021813 A1* | 1/2008 | Simpson et al. | 705/38 |
| 2008/0027749 A1 | 1/2008 | Meyer et al. | |
| 2008/0052234 A1 | 2/2008 | Keohane et al. | |
| 2008/0091530 A1 | 4/2008 | Egnatios et al. | |
| 2008/0215377 A1 | 9/2008 | Wottowa et al. | |
| 2008/0228511 A1 | 9/2008 | Barden | |
| 2008/0249844 A1 | 10/2008 | Abe et al. | |
| 2008/0275800 A1 | 11/2008 | Abe et al. | |
| 2009/0018937 A1 | 1/2009 | Joao | |
| 2009/0157449 A1* | 6/2009 | Itani et al. | 705/7 |
| 2009/0171756 A1* | 7/2009 | De Zilwa et al. | 705/10 |
| 2009/0171838 A1 | 7/2009 | Liu et al. | |
| 2009/0190729 A1 | 7/2009 | Chakraborty et al. | |
| 2009/0192809 A1 | 7/2009 | Chakraborty et al. | |
| 2009/0198610 A1 | 8/2009 | Wu et al. | |
| 2009/0222313 A1* | 9/2009 | Kannan et al. | 705/9 |
| 2009/0234710 A1 | 9/2009 | Belgaied Hassine et al. | |
| 2009/0276289 A1* | 11/2009 | Dickinson et al. | 705/10 |
| 2009/0276368 A1 | 11/2009 | Martin et al. | |
| 2009/0292583 A1* | 11/2009 | Eilam et al. | 705/10 |
| 2009/0307074 A1* | 12/2009 | Sharma | 705/14.25 |
| 2009/0327123 A1 | 12/2009 | Wolfson | |
| 2010/0057548 A1* | 3/2010 | Edwards | 705/14.13 |
| 2010/0106585 A1 | 4/2010 | Etheredge et al. | |
| 2010/0106589 A1 | 4/2010 | Etheredge et al. | |
| 2010/0138282 A1* | 6/2010 | Kannan et al. | 705/10 |
| 2010/0161379 A1* | 6/2010 | Bene et al. | 705/10 |
| 2010/0179860 A1* | 7/2010 | Noel et al. | 705/10 |
| 2010/0274687 A1 | 10/2010 | Ghosh et al. | |
| 2010/0306091 A1 | 12/2010 | Homer et al. | |
| 2010/0306094 A1 | 12/2010 | Homer et al. | |
| 2010/0312679 A1 | 12/2010 | Lebouitz | |
| 2011/0022454 A1* | 1/2011 | Lefebvre et al. | 705/14.25 |
| 2011/0029431 A1 | 2/2011 | Knapp | |
| 2011/0131122 A1 | 6/2011 | Griffin et al. | |
| 2011/0131130 A1 | 6/2011 | Griffin et al. | |
| 2011/0131131 A1 | 6/2011 | Griffin et al. | |
| 2011/0178908 A1 | 7/2011 | Benefield et al. | |
| 2011/0191173 A1 | 8/2011 | Blackhurst et al. | |
| 2011/0191180 A1 | 8/2011 | Blackhurst et al. | |
| 2011/0246346 A1 | 10/2011 | Satyavolu et al. | |
| 2011/0251874 A1* | 10/2011 | Banthia et al. | 705/7.31 |
| 2011/0295731 A1 | 12/2011 | Waldron et al. | |
| 2011/0313835 A1* | 12/2011 | Falkenborg et al. | 705/14.25 |
| 2011/0313900 A1* | 12/2011 | Falkenborg et al. | 705/30 |
| 2012/0004969 A1 | 1/2012 | Satyavolu et al. | |
| 2012/0004970 A1 | 1/2012 | Satyavolu et al. | |
| 2012/0010933 A1 | 1/2012 | Satyavolu et al. | |
| 2012/0022917 A1* | 1/2012 | Lawton et al. | 705/7.31 |
| 2012/0023009 A1 | 1/2012 | Pazlar et al. | |
| 2012/0053972 A1* | 3/2012 | Lawton et al. | 705/7.11 |
| 2012/0078766 A1* | 3/2012 | Rose et al. | 705/35 |
| 2012/0078813 A1* | 3/2012 | Rose et al. | 705/36 R |
| 2012/0109802 A1 | 5/2012 | Griffin et al. | |
| 2012/0143735 A1* | 6/2012 | Pascal Leo et al. | 705/34 |
| 2013/0054334 A1* | 2/2013 | Ross et al. | 705/14.25 |
| 2013/0060669 A1 | 3/2013 | Rose et al. | |
| 2013/0073386 A1 | 3/2013 | Rose et al. | |
| 2014/0095392 A1 | 4/2014 | Rose et al. | |

OTHER PUBLICATIONS

Notice of Allowance for related U.S. Appl. No. 13/226,926 mailed Aug. 1, 2013.

Non-Final Office Action for U.S. Appl. No. 13/407,111 mailed Aug. 7 2013.

American Marketing Association, "How Merrill Lynch Optimizes Inbound Interactions with Real-Time Decisioning" 2010 Portrait Software Presentation, 28 pages.

"How Interaction Optimizer is changing the game at a major US investment management company" Portrait Software case study <www.portraitsoftware.com>. Nov. 2009, 2 pages.

Non-Final Office Action for U.S. Appl. No. 12/893,841 mailed Dec. 22, 2011.

Final Office Action for U.S. Appl. No. 12/893,841 mailed May 7, 2012.

Non-Final Office Action for U.S. Appl. No. 12/893,822 mailed Aug. 20, 2012.

Non-Final Office Action for U.S. Appl. No. 12/893,841 mailed Sep. 26, 2012.

Final Office Action for U.S. Appl. No. 12/893,822 mailed Feb. 27, 2013.

Final Office Action for U.S. Appl. No. 12/893,841 mailed Mar. 14, 2013.

Non-Final Office Action for related U.S. Appl. No. 13/226,926 mailed Dec. 27, 2012.

Notice of Allowance for related U.S. Appl. No. 13/226,926 mailed Apr. 22, 2013.

Non-Final Office Action for U.S. Appl. No. 13/237,583 mailed Mar. 13, 2013.

"Aperio Uplift Optimizer for Signature." Fiserv, Inc. <www.signature.fiserv.com>, 2 pages. 2003.

"Aperio Customer Analytics for Signature." Fiserv, Inc. <VvWW.signature.fiserv.com>, 4 pages. 2003.

"Aperio Interaction Optimizer for Signature." Fiserv, Inc. <VvWW.signature.fiserv.com>, 2 pages. 2003.

Crosman, Penny, "Mitek Offers Card Balance Transfer Via Mobile Device", Sep. 8, 2011—2011 American Banker and SourceMedia, Inc., <http://www.americanbanker.com/issues/176_175/mitek-mobile-card-balance-transfer-1042000-1.html>, 1 page. Accessed: Sep. 20, 2011.

Notice of Allowance for related U.S. Appl. No. 13/407,111 dated Jan. 22, 2014.

Notice of Allowance for related U.S. Appl. No. 14/100,242 dated Jan. 29, 2014.

\* cited by examiner

SYSTEMS AND METHODS FOR EVALUATING ALTERNATIVE FINANCIAL PRODUCTS

CROSS-REFERENCE TO RELATED APPLICATIONS

The present application is related to U.S. patent application Ser. No. 13/407,111, entitled "Systems and Methods for Migrating Customers to Alternative Financial Products" and filed on Feb. 28, 2012, the contents of which are incorporated by reference herein in their entirety.

TECHNICAL FIELD

Aspects of the disclosure relate generally to financial products, and more particularly, to systems and methods for evaluating alternative financial products for customer migration.

BACKGROUND

Many financial institutions wish to migrate customers from existing financial products to alternative financial products. For example, a financial institution may wish to migrate customers from a free product, such as a free checking account product or a free debit account product, to one or more fee-based alternative products. However, while the increased revenue that may be obtained by migration of customers to alternative products is attractive, the increased revenue may be easily offset or significantly reduced by customer attrition. Accordingly, the context of the disclosure relates to automated systems associated with financial product migration.

BRIEF DESCRIPTION OF THE DRAWINGS

Reference will now be made to the accompanying drawings, which are not necessarily drawn to scale, and wherein.

DETAILED DESCRIPTION

Figure 1:
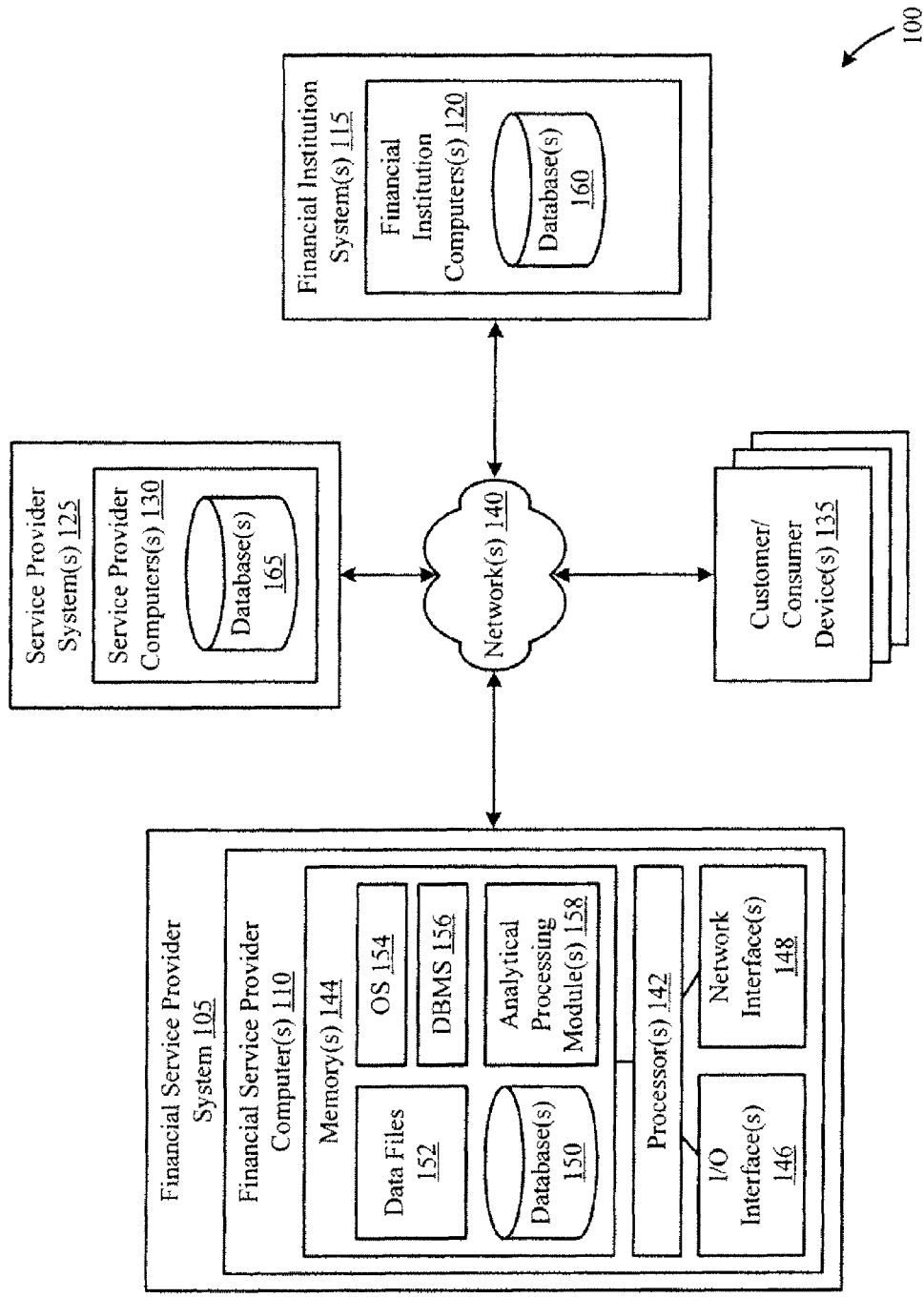
FIG. 1 illustrates a block diagram of an example system that supports services associated with the migration of customers or consumers from a first financial product to one or more alternative financial products, according to an illustrative embodiment of the disclosure.

Certain embodiments of the disclosure will now be described more fully hereinafter with reference to the accompanying drawings, in which example embodiments of the invention are shown. This invention may, however, be embodied in many different forms and should not be construed as limited to the representative embodiments set forth herein; rather, these representative embodiments are provided so that this disclosure will be thorough and complete, and will fully convey the scope of the invention to those of ordinary skill in the art. Like numbers refer to like elements throughout.

Certain embodiments of the disclosure may provide systems and methods for performing pre-migration testing in association with financial product migrations. In one example embodiment, a set of customers that are eligible for migration from a first financial product (e.g., a free checking account, a free debit account, etc.) to a second financial product (e.g., a fee-based checking account, a fee-based debit account, etc.) may be identified. A wide variety of suitable techniques may be utilized to identify the set of customers. For example, a financial institution (e.g., a bank, etc.) that provides the financial products may identify the set of customers. As another example, a plurality of customers associated with the financial institution may be evaluated utilizing any number of suitable criteria and/or parameters (e.g., parameters and/or criteria associated with various alternative financial products), and a subset of the plurality of customers may be identified as the set of customers eligible for migration. As yet another example, a service provider may identify the set of customers on behalf of the financial institution, and the identified set of customers may be received from the service provider.

Once a set of customers eligible for migration to a second financial product has been identified, a pre-migration test may be performed for a subset of the eligible customers. Based at least in part upon the results of the pre-migration test, an attrition risk associated with the migration of the set of customers to the second financial product may be determined or calculated. In the event that the attrition risk is determined to be acceptable, a migration of the set of customers to the second financial product may be directed. In the event that the attrition risk is determined to be unacceptable, a wide variety of different actions may be taken as desired in various embodiments. For example, the set of customers eligible for migration to the second financial product may be modified. As another example, one or more parameters or characteristics associated with the second financial product may be modified. In this regard, pre-migration testing may be utilized to perform one or more optimizations associated with the migration of customers of a financial institution from existing financial products to any number of alternative financial products.

A wide variety of suitable techniques may be utilized as desired to perform a pre-migration test. In one example embodiment, a respective pre-migration notice attrition risk (also referred to as a pre-notice risk) may be determined for each of the customers included in a subset of customers. As desired, the pre-notice risk for a customer may be compared to one or more threshold values. If it is determined that the pre-notice risk fails to satisfy the one or more threshold values, the customer may be removed from the subset and, in certain embodiments, one or more additional customers may be added to the subset. Following the determination of pre-notice attrition risks, a respective migration notice may be communicated to each of the customers in the subset. A respective post-migration notice attrition risk (also referred to as a post-notice risk) may then be determined for each of the customers. An attrition risk associated with the migration of the eligible customers may then be determined from the pre-notice attrition risks and the post-notice attrition risks. For example, an average change in the pre-notice attrition risks and the post-notice attrition risks may be calculated. The average change may then be compared to any number of suitable threshold values in order to determine whether a migration should be completed.

Other embodiments of the disclosure may provide systems and methods for determining and/or optimizing one or more characteristics associated with an alternative product for migration. In one example embodiment, one or more customers of a financial institution eligible for migration to an alternative product (e.g., eligible for migration to a first financial product from a second financial product, etc.) may be identified. An attrition risk associated with the migration may then be determined, for example, by performing pre-migration testing. In the event that the attrition risk satisfies one or more threshold values, the migration of the one or more customers may be directed and/or carried out. However, in the event that the attrition risk fails to satisfy the one or more threshold values, one or more characteristics associated with the alternative product may be modified. As desired, an attrition risk associated with the modified product may be calculated and evaluated in order to determine whether a migration should be directed and/or carried out. Further modifications may be performed as desired until relatively optimal alternative product characteristics have been determined.

Additionally, as desired in various embodiments, once a migration has been initiated and/or carried out, any number of attrition mitigation procedures may be performed with respect to one or more customers. For example, an attrition risk associated with a customer may be identified or determined either following the communication of a migration notice to the customer or following the migration of the customer to an alternative financial product. In the event that the attrition risk fails to satisfy one or more thresholds associated with an acceptable attrition risk, one or more mitigation procedures may be performed. In this regard, an attempt may be made to retain the customer.

It will be appreciated that the evaluations and/or optimizations described herein, or at least a portion thereof, can be performed by any number of financial systems, such as one or more service providers, one or more financial service providers, a financial institution, or a combination thereof. In one example embodiment, a financial service provider may receive and/or obtain customer information and/or alternative product information from a financial institution or another service provider (e.g., a service provider that provides online banking functionality to a financial institution, etc.). The financial service provider computer may then perform pre-migration analysis, direct migrations, and/or modify one or more alternative products. In another example embodiment, a unit or component of a financial institution may perform functionality similar to that described above for the financial service provider, including pre-migration analysis and/or evaluation of one or more alternative products. For example, various operations described herein may be performed by suitable software running locally one or more financial institution computers. Indeed, a wide variety of different architectures and/or system configurations may be utilized as desired to perform the various operations described herein. A few non-limiting example architectures are described in greater detail below.

I. System Overview

FIG. 1 illustrates a block diagram of an example system 100 that supports services associated with the migration of customers from a first financial product (or multiple first financial products) to one or more alternative financial products, according to an illustrative embodiment of the disclosure. Although various components, computing devices, and/or computers are illustrated in FIG. 1, it is appreciated that corresponding entities and/or individuals may be associated with each of the illustrated components and/or computers. According to various embodiments, there may be: one or more financial service provider systems 105, each associated with one or more financial service provider computers 110; one or more financial institution systems 115, each associated with one or more financial institution computers 120; one or more service provider systems 125, each associated with one or more service provider computers 130; and/or one or more customer or consumer devices 135. In certain embodiments, the financial service provider systems 105 may be associated with one or more financial service provider entities; the financial institution systems 115 may be associated with one or more financial institutions (e.g., banks, etc.); the service provider systems 125 may be associated with one or more service providers (e.g., service providers that provide electronic banking, bill payment, and/or other services to financial institutions, etc.); and the customer devices 135 may be associated with any number of customers.

According to various embodiments, there may be any number of each entity type, and each entity may be associated with any number of suitable systems, computers, computing devices, and/or other devices. For simplicity, the entities, systems, computers, and/or devices may be referenced in the singular, but it is appreciated that the same description applies to embodiments including multiple entities, systems, computers, and/or devices. Similarly, for each of the computers described herein, it is appreciated that the computer may include any number of suitable components and/or functionalities. Moreover, although detailed descriptions of system components are provided for the financial service provider system 105, it is appreciated that any of the other components of the system 100 may be configured in any suitable manner, which may be similar to that described herein for the financial service provider system 105.

Additionally, the various migration services and/or financial product optimizations described herein may be performed by a wide variety of different entities and/or components of the system 100. As one example, the financial institution system 115 may provide customer data (e.g., core customer account data, etc.), alternative product criteria, and/or other data to the financial service provider system 105, and the financial service provider system 105 may utilize at least a portion of the received data and/or criteria to perform migration and/or financial product optimization services on behalf of the financial institution. As another example, one or more service provider systems 125 may provide a wide variety of financial services to one or more financial institutions, such as account processing services, electronic banking services, and/or electronic bill presentment and payment (EBPP) services. As such, the service provider systems 125 may maintain and/or have access to data utilized to perform migration and/or product optimization services. In certain embodiments, the service provider systems 125 may perform migration and/or product optimization services on behalf of one or more financial institutions. In other embodiments, the service provider systems 125 may communicate data and/or facilitate the communication of data to the financial service provider system 105, and the financial service provider system 105 may perform migration and/or product optimization services. As yet another example, the financial service provider system 105 may host and/or perform electronic banking and/or EBPP services on behalf of one or more financial institutions, and the financial service provider system 105 may additionally perform migration and/or product optimization services. As yet another example, a financial institution system 115 may perform migration and/or product optimization services. Other architectures and configurations will be appreciated. Indeed, a wide variety of different entities may include and/or be associated with a financial system that provides the migration and/or financial product optimization services described herein. As such, the term "financial system" refers to any suitable computer, system, and/or combination thereof that is configured to perform migration and/or financial product optimization services.

As desired, certain components of the system 100 may be in communication with one another via any number of suitable networks which, as described below, can include one or more separate or shared private and/or public networks, including the Internet, a public switched telephone network, one or more financial networks, one or more local area networks, and/or one or more wide area networks. In addition, various components of the system 100, such as the financial service provider computers 110, the financial institution computers 120, and/or the service provider computers 130, may maintain one or more databases and/or have access to one or more databases or other data sources via one or more suitable networks, which may be the same as or different from networks 140. The illustrated components of FIG. 1 will now be discussed in further detail.

The financial service provider system 105 may include any number of financial service provider computers 110 that operate to obtain (e.g., access, receive, etc.) a wide variety of information associated with financial product migrations (e.g., information associated with customers of a financial institution, information associated with existing financial products, information associated with alternative financial products, parameters associated with assigning customers to alternative products, risk thresholds, risk mitigation parameters, etc.) and utilize at least a portion of the information to perform any number of product migration-related services, such as pre-migration testing, alternative product testing, and/or alternative product modification and/or optimization. A financial service provider computer 110 may be any suitable processor-driven device, such as, but not limited to, a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the financial service provider computer 110 may form a special purpose computer or other particular machine that is operable to facilitate the performance of product migration-related services and/or other associated financial services. Although a single financial service provider computer 110 is described herein, the operations and/or control of the financial service provider computer 110 may be distributed among any number of computers and/or processing components.

In addition to having one or more processors 142, the financial service provider computer 110 may include one or more memory devices 144 (also referred to as memory), one or more input/output (I/O) interfaces 146, and one or more network interfaces 148. The memory devices 144 may be any suitable memory devices, for example, caches, read-only memory devices, random access memory devices, magnetic storage devices, removable storage devices, flash memory devices, etc. Additionally, any number of logical data storage constructs may be stored as desired within the memory devices 144, such as one or more databases 150. In addition or in the alternative, other databases and/or data sources may be accessed via one or more suitable networks. The memory devices 144 may further store a wide variety of data, such as any number of data files 152. Additionally, the memory devices 144 may store executable instructions and/or various program modules utilized by the financial service provider computer 110, for example, an operating system (OS) 154, a database management system (DBMS) 156, and/or one or more analytical processing modules 158.

The data files 152 and/or the databases 150 may include any suitable data that facilitates the performance of migration-related services and/or other associated financial services. For example, the data files 152 and/or optimization database 150 may include information associated with customers of one or more financial institutions (e.g., customer identification information, customer profile information, customer segmentation information, customer value information, etc.), core account, electronic banking, and/or EBPP data (e.g., account information, historical transaction data, etc.) associated with customers of one or more financial institutions, information associated with existing financial products offered by one or more financial institutions (e.g., parameters and/or criteria associated with financial products, customers assigned to various financial products, etc.), information associated with alternative financial products (e.g., alternative financial product definitions, alternative financial product parameters and/or criteria, thresholds and/or preferences associated with modifying alternative financial product parameters, etc.), information associated with the assignment of customers to alternative financial products for migration (e.g., received customer assignments, parameters for assigning customers to alternative financial products, etc.), any number of attrition risk thresholds and/or parameters to be utilized in association with pre-migration testing and/or post-migration risk mitigation, parameters and/or thresholds associated with pre-migration testing, etc. As desired, the data files 152, the databases 150, and/or any number of suitable processing modules may additionally store predictive models, calculation algorithms, processing logic, and/or various rules utilized to perform one or more migration-related services.

The OS 154 may be a suitable software module that controls the general operation of the financial service provider computer 110. The OS 154 may also facilitate the execution of other software modules by the one or more processors 142, for example, the DBMS 156 and/or the analytical processing modules 158. The OS 154 may be, but is not limited to, Microsoft Windows®, Apple OSX™, Linux, Unix, or a mainframe operating system. The DBMS 156 may facilitate the management of information stored in the databases 150 and/or in any number of external databases. As desired, other suitable software modules may also be provided. For example, one or more host modules and/or application programming interfaces (APIs) may manage interactions and communications between the financial service provider computer 110 and any number of external systems, such as the financial institution computers 120 and/or the service provider computers 130. In this regard, the host modules can interface with various modules associated with other components of the system 100 in order to facilitate the procurement or receipt of data (e.g., core account data, customer data, parameters and/or preferences, etc.), as well as the communication of any number of messages to the other components, such as messages associated with the results of migration-related services and/or instructions associated with the migration of customers to alternative financial products.

Additionally, in certain embodiments, one or more host modules (e.g., Web servers, etc.) may be configured to communicate a wide variety of different interfaces and/or graphical user interfaces, such as one or more interfaces that facilitate the receipt of data (e.g., information associated with customers, information associated with alternative products, preferences and/or parameters associated with performing migration-related services, etc.) and/or requests from, or a presentation of results or other information to, a financial institution computer 120 and/or a service provider computer 130. As another example, in certain embodiments, different interfaces may be configured to present product migration information (e.g., migration notices, etc.) to customers via the customer devices 135. For example, a financial service provider system 105 may be configured to host electronic banking services on behalf of a financial institution, and migration notices may be presented to customers via an electronic banking interface. An interface can be in the form of one or more browser-based or Internet-based Web pages, although interfaces can also be presented through specialized software programs (e.g., stand-alone application, applet, mobile device application, etc.). It will be appreciated that the interface can be formatted for display on a mobile device (e.g., personal communications device like a BlackBerry, iPhone, etc.) or non-mobile device (e.g., desktop computer, server computer, etc.), according to example embodiments. The interface may be associated with security settings to enable access by certain registered users of the financial service provider system 105 and/or the financial institution system 115. As desired, a private interface may be branded in accordance with specifications and/or preferences of a partner entity. Additionally, as desired in certain embodiments, the financial service provider computers 110 may be configured to provide a web services interface layer to another entity or component of the system 100.

The analytical processing modules 158 may include one or more suitable software modules and/or applications that are operable, configured, and/or programmed to perform any number of migration-related services, such as pre-migration testing, alternative product evaluation and/or optimization, and/or post-migration risk mitigation. In doing so, the analytical processing modules 158 may access and/or obtain a wide variety of suitable information, such as customer information, core financial data, and/or preferences associated with various migration-related services. The analytical processing modules 158 may be configured to receive data from the databases 150, the data files 152, and/or from any number of external sources, such as external databases, the financial institution computers 120, and/or the service provider computers 130. Additionally, the analytical processing modules 158 may be configured to invoke a wide variety of predictive models (e.g., stored predictive models, remote predictive models, etc.) and/or evaluation techniques, for example, one or more predictive models that determine or calculate respective attrition risks associated with various customers and/or the migration of the customers to alternative financial products.

The analytical processing modules 158 may additionally be configured to communicate information associated with migration-related services to a wide variety of different recipients. For example, information associated with the assignment of customers to various alternative financial products, information associated with the modification of alternative financial products, and/or information associated with calculated or determined attrition risk may be communicated to the financial institution computers 120 and/or the service provider computers 130. As another example, migration notices and/or information associated with post-migration (or post-notice) mitigation of attrition risk may be communicated to any number of customer devices. As desired, a wide variety of different reporting functions may also be performed by the analytical processing modules 158.

Additional details of the operations of the analytical processing modules 158 and/or the operating logic and functionality of the financial service provider system 105 are provided below with reference to FIGS. 2-6.

With continued reference to the financial service provider computer 110, the one or more I/O interfaces 146 may facilitate communication between the financial service provider computer 110 and one or more input/output devices; for example, one or more user interface devices, such as a display, a keypad, a mouse, a pointing device, a control panel, a touch screen display, a remote control, a microphone, a speaker, etc., that facilitate user interaction with the financial service provider computer 110. For example, one or more financial service provider employees or potentially even financial institution employees may interact with the financial service provider computer 110 in order to establish various parameters associated with various operational aspects, to review migration-related service results, and/or to review various logs and/or reports. The one or more network interfaces 148 may facilitate connection of the financial service provider computer 110 to one or more suitable networks, for example, the network(s) 140 illustrated in FIG. 1, or local area network(s) within the financial service provider system 105. In this regard, the financial service provider computer 110 may receive and/or communicate information to other components of the system 100, such as external databases, the financial institution computers 120, the service provider computers 130 and/or the customer devices 135.

With continued reference to FIG. 1, any number of financial institution systems 115 may be provided. Each financial institution system 115 may be associated with a financial institution, such as a bank or a credit union. Additionally, each financial institution system 115 may include any number of financial institution computers 120. Although not described or illustrated in detail, each financial institution computer 120 may be configured in the same or similar manner as described for the financial service provider computer 110. For example, a financial institution computer 120 may include one or more processor-based computers operable to store and execute computer-executable instructions, each having one or more processors, memories, I/O interfaces, network interfaces, operating systems, data files, databases or other data storage means, DBMS, and other operating logic to perform some or all of the same or similar functions as are described herein with reference to the financial service provider computer 110.

As set forth above, in certain embodiments, a financial institution computer 120 may be configured to perform a wide variety of account processing, electronic banking, and/or EBPP functions on behalf of customers of the financial institution. In other embodiments, a financial institution may utilize any number of service providers to provide a portion or all of account processing, electronic banking, and/or EBPP functionality. Additionally, in certain embodiments, a financial institution computer 120 may be configured to perform migration-related services. In other embodiments, a financial institution may utilize one or more service providers to provide a portion or all of the desired migration-related services.

Further, as illustrated in FIG. 1, the financial institution computers 120 may be configured to store or may otherwise be associated with any number of suitable databases 160. The databases 160 may be utilized to store a wide variety of information associated with customers of the financial institution, as well as various preferences or parameters associated with the performance of migration-related services. Examples of suitable customer information include, but are not limited to, account processing (AP) data, electronic banking data, EBPP data, and/or customer profile data. The AP data may include a wide variety of account information and/or transaction information associated with customers of a financial institution, such as core account processing data associated with the financial institution. Examples of AP data include, but are not limited to, payment and/or other transaction history information associated with one or more accounts (e.g., demand deposit accounts, etc.) for each customer of the financial institution and/or a wide variety of customer and/or account information that may be utilized in conjunction with various models, calculations and/or business rules, such as customer segment information, customer attrition risk information, customer loyalty information, etc. In certain embodiments, the AP data may include debit card payment data, check transaction data, automated check transaction data, and/or automated clearinghouse payment data, including recurring debit payments and/or payments performed through one or more bill payment and/or person-to-person payment services. The electronic banking data may include a wide variety of information associated with online banking activities including, but not limited to, account information, various payment data and/or transaction data. The EBPP data may include a wide variety of information associated with the provision of EBPP services including, but not limited to, electronic billing information, such as copies of electronic bills, bill summary information, and/or links (e.g., hyperlinks, etc.) to billing information stored by another entity (e.g., a biller or a biller service provider), as well as a wide variety of payee and payment history information. As desired in certain embodiments, information stored in the databases 160 may be utilized by the financial institution computers 120 to perform migration-related services. In other embodiments, at least a portion of the stored information may be communicated to one or more other components of the system to facilitate the provision of migration-related services.

With continued reference to FIG. 1, any number of service provider systems 125 may be provided. Each service provider system 125 may be associated with a service provider, such as an account processing service provider, an electronic banking service provider, or an EBPP service provider. Additionally, each service provider system 125 may include any number of service provider computers 130. Although not described or illustrated in detail, each service provider computer 130 may be configured in the same or similar manner as described for the financial service provider computer 110. For example, a service provider computer 130 may include one or more processor-based computers operable to store and execute computer-executable instructions, each having one or more processors, memories, I/O interfaces, network interfaces, operating systems, data files, databases or other data storage means, DBMS, and other operating logic to perform some or all of the same or similar functions as are described herein with reference to the financial service provider computer 110.

As set forth above, in certain embodiments, a service provider computer 130 may be configured to perform a wide variety of account processing, electronic banking, and/or EBPP functions on behalf of one or more financial institutions. Additionally, in certain embodiments, a service provider computer 130 may be configured to perform migration-related services. In other embodiments, a service provider may utilize one or more financial service providers to provide a portion or all of the desired migration-related services. Further, as illustrated in FIG. 1, the service provider computer 130 may be configured to store or may otherwise be associated with any number of suitable databases 165. The databases 165 may be utilized to store a wide variety of information associated with customers of the financial institution and/or services provided on behalf of the financial institution, as well as various preferences or parameters associated with the performance of migration-related services.

Additionally, any number of customer devices 135 may be provided. Although not described or illustrated in detail, each customer device 135 may be a suitable processor-driven device, such as a personal computer, a tablet computer, or a mobile device (e.g., a mobile phone, etc.), that facilitates the receipt of information associated with financial services and/or financial products, such as information associated with electronic banking and/or EBPP services, as well as information associated with product migrations (e.g., information associated with alternative financial products, migration notices, etc.). As such, a customer device 135 may include any number of processors, memory devices, I/O interfaces, and/or network interfaces. The processors may access computer-executable instructions and/or programming modules (e.g., a Web browser) that facilitate operations of the customer device 135 in accordance with various embodiments of the disclosure.

The networks 140 may include any number of telecommunication and/or data networks, whether public, private, or a combination thereof including, but not limited to, the Internet, a local area network, a wide area network, an intranet, intermediate handheld data transfer devices, public switched telephone networks, financial networks, and/or any combination thereof and may be wired and/or wireless. The networks 140 may also allow for synchronous, including real-time, and/or asynchronous, including batch, transactions to be transmitted thereover. Due to network connectivity, various methodologies described herein may be practiced in the context of distributed computing environments. Additionally, a wide variety of devices, such as gateways and routers, may be utilized to provide connectivity between or among networks.

II. Operational Overview

In various embodiments of the invention, a wide variety of migration-related services may be performed. These services include, for example, pre-migration testing, evaluation and/or optimization of alternative financial products, and/or post-migration risk mitigation. In certain embodiments, pre-migration testing may evaluate an attrition risk associated with a mass migration of financial institution customers from one or more existing products (e.g., a free checking account product, a free debit account product, etc.) to one or more alternative financial products, such as one or more fee-based products. As desired, various tiers of alternative financial products may be evaluated. Additionally, in certain embodiments, the results of pre-migration testing may be utilized to modify and/or determine parameters associated with alternative financial products, as well as to modify the assignment of customers for migration to various alternative financial products. In this regard, attrition risks may be managed during the migration of customers to alternative financial products.

Figure 2:
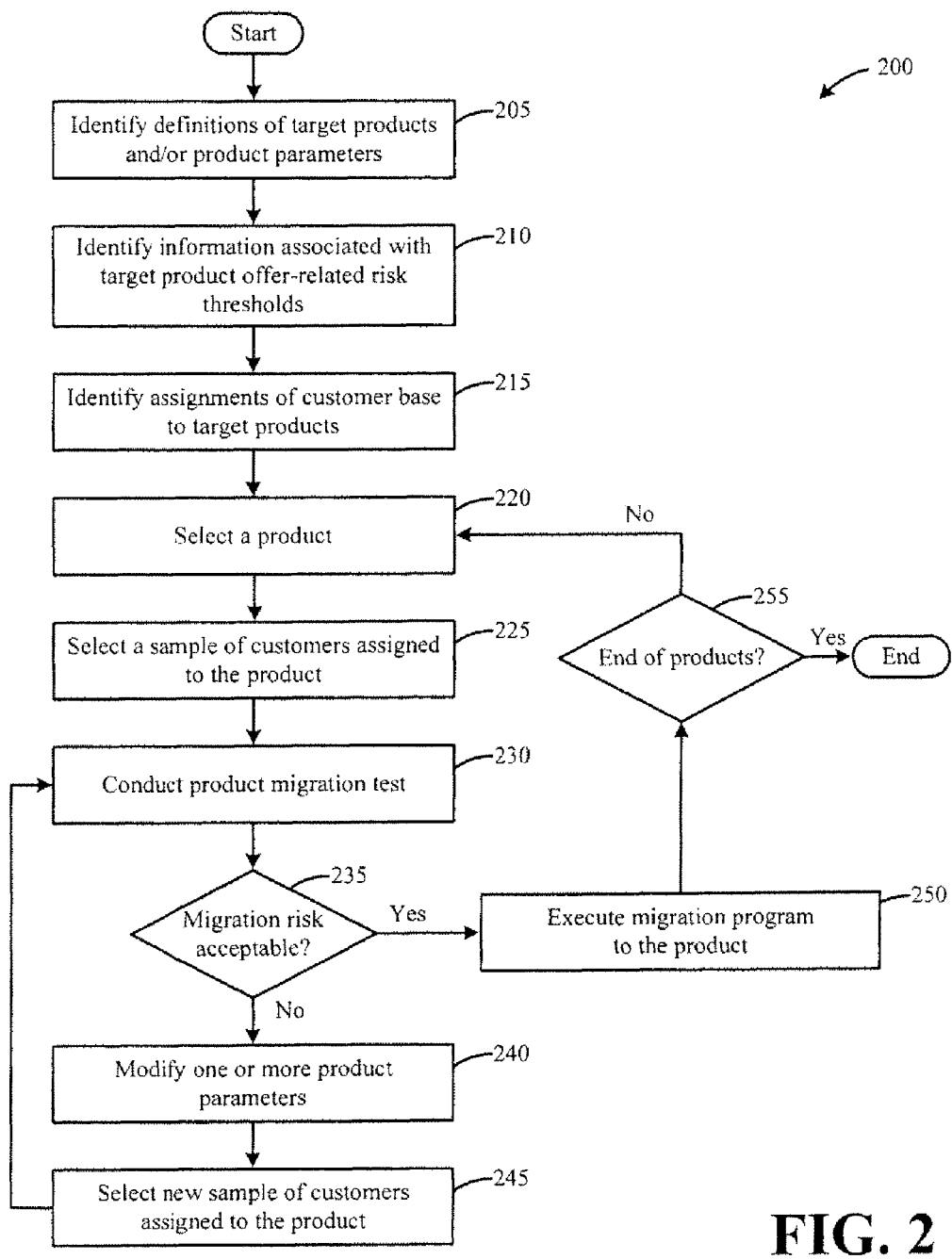
FIG. 2 illustrates a flow diagram of an example method for performing a pre-migration risk analysis in association with a proposed financial product migration, according to an illustrative embodiment of the disclosure.

FIG. 2 illustrates a flow diagram of an example method for performing a pre-migration risk analysis in association with a proposed financial product migration, according to an illustrative embodiment of the disclosure. The method 200 may be performed by a suitable financial system and/or associated financial computers, such as the financial service provider system 105 and/or associated financial service provider computers 110 illustrated in FIG. 1, the financial institution system(s) 115 and/or financial institution computers 120 illustrated in FIG. 1, or the service provider system(s) 125 and/or service provider computers 130 illustrated in FIG. 1. The method 200 may begin at block 205.

At block 205, definitions associated with one or more target products or alternative financial products may be identified. Additionally, any number of parameters associated with the products may be identified. In certain embodiments, a financial institution (or a service provider acting on behalf of the financial institution) may define a set of target products or product tiers for a given type of financial product. Customers of the financial institution may then be migrated to various target products or product tiers. For example, the financial institution may have a plurality of customers that are currently provided with a free checking account product. In an attempt to migrate customers to fee-based checking arrangements, the financial institution may define a plurality of different checking account target products. As another example, the financial institution may define a set of target products associated with debit card products.

Additionally, the financial institution (or a service provider) may define any number of parameters or characteristics for each of the target products. For any given product, these parameters may include, for example, qualification criteria for a customer to be eligible for migration to a product and/or any number of attributes associated with the product. A wide variety of suitable qualification criteria may be utilized to facilitate assignment of customers to various target or alternative products. Examples of suitable qualification criteria include, but are not limited to, a minimum balance to be maintained in a financial account, a minimum daily or average balance to be maintained in a financial account within a given period of time (e.g., the previous month, the previous three months, etc.), a minimum or average transaction volume (e.g., a number of transactions, a total monetary amount of transactions, etc.) to be maintained within a given period of time, a minimum or average number of various types of transactions to be completed within a given period of time (e.g., a minimum number of debit transactions per month, a minimum number of bill payment transactions per month, etc.), criteria associated with revenue generated (e.g., interest revenue, revenue from insufficient funds (NSF) fees, etc.) and/or criteria associated with other accounts (e.g., checking accounts, mortgage accounts, loan accounts, savings accounts, money market accounts, etc.) and/or relationships (e.g., electronic banking services, direct deposit services, EBPP services, etc.) that customers have with the financial institution. In certain embodiments, initially identified qualification criteria may be modified by the financial system during the performance of migration-related services.

The attributes of a product may specify any number of terms and conditions associated with the product. These terms and conditions may specify or define the services encompassed by the product, pricing for the product, and/or required customer behavior associated with the product. Example attributes include, but are not limited to, pricing terms for the product (e.g., fixed monthly fees, transaction-based fees, NSF fees, etc.), permitted activities associated with use of the product, pricing for additional activities associated with use of the product, a minimum balance to be maintained, a minimum or average balance to be maintained within a given period of time (e.g., the previous month, the previous three months, etc.), a minimum or average transaction volume (e.g., a number of transactions, a total monetary amount of transactions, etc.) to be maintained within a given period of time, a minimum or average number of various types of transactions to be completed within a given period of time, etc. Additionally, in certain embodiments, the attributes may include alternative pricing associated with different types of customer behavior. For example, the attributes may specify reduced pricing based upon certain behavior (e.g., a threshold number or volume of transactions, a threshold number of direct deposits or direct deposits per month, a threshold number of bill payments or bill payments per month, etc.). Indeed, a wide variety of different product attributes may be specified as desired. Additionally, in certain embodiments, initially identified attributes may be modified by the financial system during the performance of migration-related services.

As one simplified example of product parameters, the financial institution may define four types of checking accounts as target products. Example account types may include a flat fee checking account, an extended flat fee checking account, a regular checking account, and a free checking account. The flat fee checking option may typically be utilized for accounts with relatively low balances and relatively moderate account activity (e.g., 10-15 checks per month). The extended flat fee checking option may have a higher fee than the flat fee checking option, and the extended flat fee option may be utilized for accounts with relatively low balances and higher account activity (e.g., more than 15 checks per month). The regular checking account option may be utilized for accounts in which unlimited checking is allowed, and the regular checking account option may be associated with an established fee schedule. For example, a base monthly fee and/or a fee for each check or other transaction (e.g., electronic transaction, ATM withdrawal, etc.) may be charged. As desired, the fees may be reduced or eliminated in the event that a minimum balance (e.g., a minimum daily balance, etc.) is maintained or in the event that other types of transactions (e.g., automatic deposits, etc.) and/or customer behavior (e.g., use of online banking and/or bill payment) occurs. The free checking option may be utilized for the most valuable customers and/or for customers that maintain a predetermined account balance and/or that otherwise satisfy a set of conditions (e.g., total asset on deposit conditions, loan or credit account conditions, transaction type conditions, customer behavior conditions, etc.). The product offerings described above are provided by way of example only, and other offerings may be utilized as desired in other embodiments of the invention.

A wide variety of suitable methods may be utilized by a financial system to identify definitions of target products and/or various product parameters. In certain embodiments, the financial system may access definitions and/or parameters from memory. In other embodiments, the financial system may receive definitions and/or parameters from one or more external data sources, such as a financial institution system or a service provider system. A wide variety of suitable methods and/or techniques may be utilized to receive definitions and/or parameters. For example, definitions and/or parameters may be received via a Web interface hosted by the financial system. As another example, definitions and/or parameters may be received via batch data transmission and/or via any number of application service calls.

At block 210, information associated with a wide variety of risk thresholds for target product offerings and/or product migrations may be identified. In certain embodiments, a financial institution (or service provider) may establish one or more risk thresholds for each product tier, and the thresholds may be utilized to evaluate proposed product migrations and/or to perform any number of risk mitigation procedures. A wide variety of suitable techniques may be utilized to establish risk thresholds. For example, risk thresholds may be established by trial and error. As another example, risk thresholds may be established based upon a statistical analysis of historical information. Additionally, a wide variety of suitable methods may be utilized by a financial system to identify risk thresholds. For example, risk thresholds may be accessed from memory, received via batch transmission, received via one or more application service calls, and/or received via a Web interface hosted by the financial system.

A wide variety of respective risk thresholds may be identified for each target product offering. As one example, a first threshold may define a maximum pre-migration notice attrition risk to be utilized during the evaluation of individual customers; a second threshold may define a maximum average change in attrition risk for use during the evaluation of a set of customers following the communication of migration notices to the set of customers; and a third threshold may define a maximum individual attrition risk associated with performing post-migration attrition mitigation procedures. These example thresholds will be described in greater detail below with reference to FIGS. 3, 4, and 6. Additionally, it should be noted that other types of risk thresholds may be utilized as desired in various embodiments. The risk thresholds described herein are provided by way of example only.

At block 215, assignments of financial institution customers to various target products (e.g., tiers of products, etc.) may be identified. In certain embodiments, a financial institution system or service provider system may provide information associated with customer assignments to various target products to the financial system. In other embodiments, one or more criteria associated with the assignment of customers to target products may be obtained and utilized to facilitate the assignment of customers to various target products. For example, at least a portion of the qualification criteria identified at block 205 may be utilized to evaluate a customer base of the financial institution (e.g., a plurality of customers that are currently provided an existing or first financial product, etc.) and to facilitate customer assignments to various target products or alternative products.

In certain embodiments, customer information (e.g., historical account and/or transaction information associated with customers, customer behavior information, etc.) may be evaluated utilizing the qualification criteria for the target products, and customers may be assigned to target products based at least in part upon the evaluation. For example, if a customer has a minimum account balance and transactional volume that qualifies the customer for a particular target product, then the customer may be assigned to the relevant target product. Accordingly, as a result of the evaluation of customer information utilizing qualification criteria, a respective set of customers may be identified for potential migration to one or more target products to be offered by a financial institution.

A wide variety of other factors may additionally or alternatively be taken into consideration during the assignment of customers to target products. These factors may include, but are not limited to, customer segmentation, customer valuation, and/or factors associated with customer fee sensitivity. For example, if a customer has a relatively high value to a financial institution (e.g., the customer generates relatively high income, etc.) and it appears that the customer is relatively sensitive to fees, then the customer may be assigned to a target product that has lower fees (e.g., a free product, etc.) or to a relatively lower attrition risk product tier.

In certain embodiments, the evaluation of customer information may result in a determination that a customer qualifies for or is eligible for migration to more than one target product. In the event that a customer is determined to qualify for multiple target products, a wide variety of suitable rules and/or evaluations may be utilized to select a target product to which the customer will be assigned. As one example, the customer may be assigned to a target product that is a "best fit" (e.g., determined via a best fit analysis or algorithm) to the customer's criteria, historical information, and/or behavior. As another example, the customer may be assigned to a target product that will provide a higher amount of revenue (e.g., fees, interest, etc.) to the financial institution. As yet another example, the customer may be assigned to the target product that will result in a lower attrition risk with respect to the customer and/or that will impose a lower fee increase to the customer. As yet another example, a customer segmentation, customer value, and/or other customer information may be utilized to select a target product. As desired in various embodiments, the rules and/or evaluations that facilitate conflict determination may be obtained from a financial institution or a service provider system. In other embodiments, default rules and/or evaluations may be utilized.

At block 220, a next target product or alternative product may be selected for evaluation. For example, if three product tiers have been established, a next product tier may be selected. Additionally, a set or group of customers that have been assigned to the selected target product may be identified. At block 225, a subset of the customers assigned to the selected target product may be identified, selected, or determined. In this regard, the subset of customers may be evaluated in order to determine risks associated with migrating the set of customers to the selected product. For example, a product migration test may be performed with respect to the subset of customers, and the results of the product migration test may be evaluated in order to determine whether the set of customers should be migrated to the target product.

A wide variety of suitable methods and/or techniques may be utilized to select a subset of customers assigned to the selected target product. For example, in certain embodiments, a random sample of customers may be selected for the subset. As another example, every "nth" customer may be selected from the set of customers in order to determine a subset. Other techniques for selecting a subset will be appreciated. As desired, the size of the subset may be proportional to the size of the set of customers assigned to the selected target product. In this regard, the subset may be sufficient to provide statistically significant results that are applicable to the set of customers. For example, a random sample may be sized to ensure a desired confidence level during product migration testing (e.g., an approximately 95% confidence level, etc.).

At block 230, a product migration test may be conducted for the selected product. A product migration test may include any number of suitable operations that facilitate a determination of a risk associated with a migration of the set of customers to the selected product. In certain embodiments, a product migration test may include a combination of pre-migration notice evaluations and/or post-notice evaluations. For example, one or more operations and/or evaluations may be performed prior to the transmission of migration notices to the customers included in the subset. As desired, the subset, customer assignments, and/or product parameters may be modified based at least in part upon the pre-notice evaluations. One example of pre-notice operations that may be performed in certain embodiments is described in greater detail below with reference to FIG. 3. Additionally, in certain embodiments, one or more operations and/or evaluations may be performed subsequent to the transmission of migration notices to the customers included in the subset (e.g., an initial subset or a modified subset). As desired, the subset, customer assignments, and/or product parameters may be modified based at least in part upon the post-notice evaluations. One example of post-notice operations that may be performed in certain embodiments is described in greater detail below with reference to FIG. 4.

Based at least in part upon conducting a product migration test at block 230, a migration risk associated with migrating the full set of customers assigned to the selected product may be determined. In certain embodiments, the migration risk may represent an attrition risk associated with the migration. At block 235, a determination may be made as to whether the migration risk is acceptable. For example, the migration risk may be compared to a suitable migration risk threshold (e.g., the second threshold described above with reference to block 210, etc.), and a determination as to whether the risk is acceptable may be made based at least in part upon the comparison.

If it is determined at block 235 that a migration risk is not acceptable, then operations may continue at block 240. At block 240, a wide variety of suitable modifications may be performed based at least in part upon the determination that the migration risk is unacceptable. For example, one or more attributes of the selected product may be modified or adjusted in an attempt to lower the attrition risk associated with product migration. A wide variety of product attributes may be modified as desired in various embodiments including, but not limited to, one or more pricing attributes, one or more services associated with the selected financial product, and/or one or more attributes associated with required customer behavior. In certain embodiments, new target products may be generated and/or a number of product tiers may be modified (e.g., a product tier may be added, a product tier may be removed, etc.). As another example, one or more qualification criteria associated with the assignment of customers to the selected product may be adjusted. As desired, the assignment of a customer base to one or more target products may be recalculated following the adjustment of one or more qualification criteria. As yet another example, other modifications of the set of customers assigned to the target product may be performed. In yet other embodiments, both one or more target product attributes and a set of customers assigned to the target product may be modified.

Following the modifications performed at block 240, operations may continue at block 245. At block 245, a new sample of customers may be selected for evaluation. For example, a new sample of customers may be selected from a set of customers assigned to a modified target product. As another example, a new sample of customers assigned to a target product may be selected following a reassignment of a portion or all of a customer base. The new sample may be selected in a similar manner as that described above at block 225. In certain embodiments, customers previously evaluated during a prior product migration test (e.g., customers included in a previously evaluated sample) may be excluded from the sample selected at block 245.

Once a new sample has been selected at block 245, operations may continue at block 230, and a product migration test may be conducted for the new sample. In this regard, product migration testing may be conducted until a determination is made that a migration risk is acceptable. As a result, attrition risk associated with the migration of customers to alternative financial products may be reduced. Additionally, parameters associated with one or more alternative financial products may be optimized in order to reduce and/or minimize attrition risks associated with customer migration.

If, however, it is determined at block 235 that the migration risk is acceptable, then operations may continue at block 250. At block 250, the financial system may execute and/or direct the execution of a migration program with respect to the selected target product (or modified target product). In certain embodiments, the financial system may direct a financial institution or a service provider to carry out a product migration with respect to any number of customers of the financial institution. In other embodiments, the financial system may carry out a product migration. A product migration program may include any number of suitable operations. As one example, respective migration notices may be communicated to the customers included in a set for migration to a target product. The migration notices may include a wide variety of suitable information, such as criteria associated with the target product and/or a date (e.g., 30 days out, 60 days out, etc.) at which the migration will occur. Once the migration date is reached, the customers may be migrated from an existing or first product to the target product. Additionally, as desired in various embodiments, respective attrition risks associated with one or more customers may be determined following the communication of a migration notice and/or following the migration of the customers. Based at least in part upon the attrition risks and/or any number of other factors (e.g., customer value, etc.), one or more attrition mitigation procedures may be directed and/or performed. A few example operations for facilitating a product migration and/or attrition risk mitigation are described in greater detail below with reference to FIGS. 5 and 6.

Following the execution of a migration program at block 250, operations may continue at block 255. At block 255, a determination may be made as to whether the end of the target products has been reached. If it is determined at block 255 that the end of the products has not been reached, then operations may continue at block 220, and a next target product may be selected for evaluation. Otherwise, if it is determined at block 255 that the end of the products has been reached, then operations may end. Additionally, although the method 200 describes the sequential evaluation of various target products, in certain embodiments, a plurality of target products may be evaluated in parallel. In certain embodiments, multiple pre-migration tests may be performed in parallel for a particular financial institution. The method 200 may end following block 255.

Figure 3:
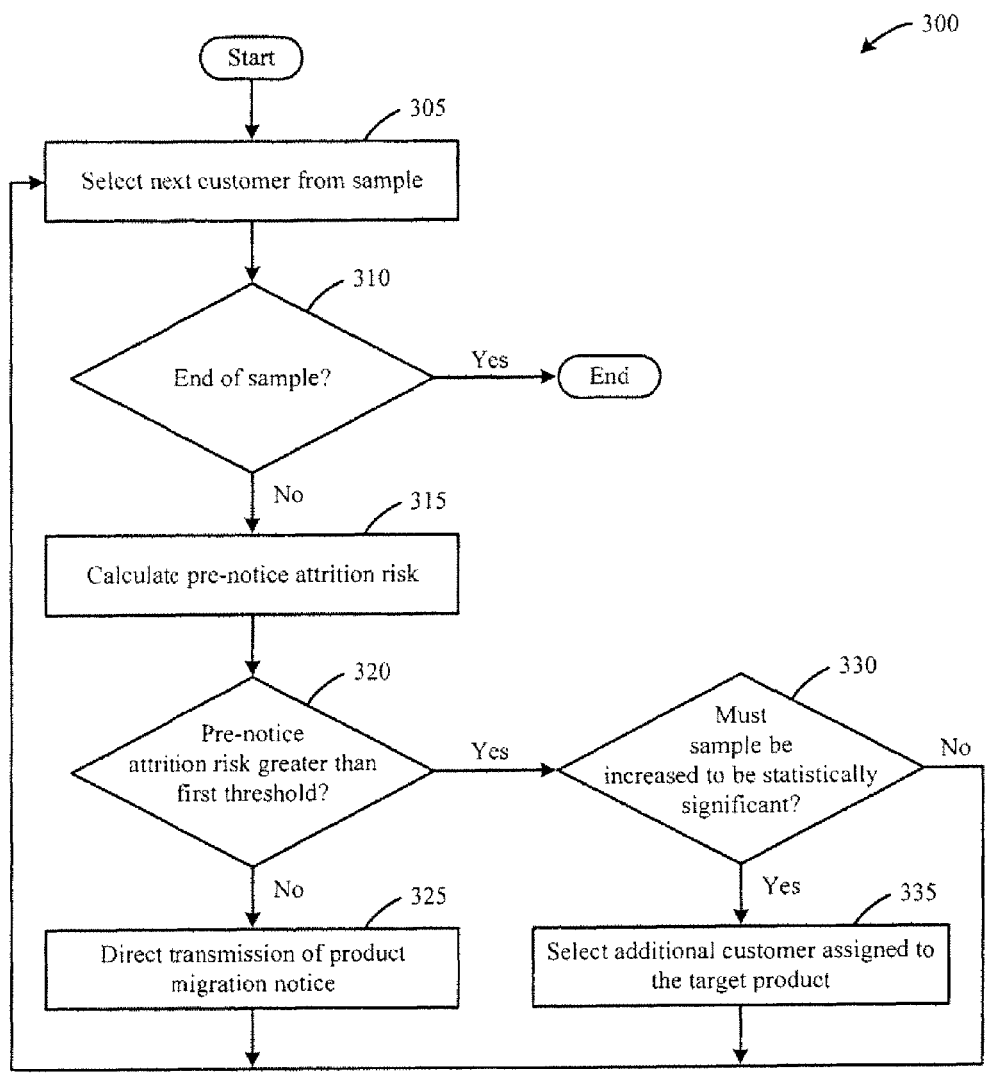
FIG. 3 illustrates a flow diagram of an example method for determining and evaluating pre-migration notice attrition risks, according to an illustrative embodiment of the disclosure.

FIG. 3 illustrates a flow diagram of an example method 300 for determining and evaluating pre-migration notice attrition risks, according to an illustrative embodiment of the disclosure. In certain embodiments, the determination and evaluation of pre-migration notice attrition risks may be carried out when conducting a product migration test, such as the product migration test described with reference to block 230 of FIG. 2. As such, the method 300 may be performed by a suitable financial system and/or associated financial computers, such as the financial service provider system 105 and/or associated financial service provider computers 110 illustrated in FIG. 1, the financial institution system(s) 115 and/or financial institution computers 120 illustrated in FIG. 1, or the service provider system(s) 125 and/or service provider computers 130 illustrated in FIG. 1. The method 300 may begin at block 305.

At block 305, a sample of customers, such as a subset of customers assigned to a target product or alternative financial product, may be identified. Additionally, a next customer included in the sample or subset of customers may be selected for evaluation. At block 310, a determination may be made as to whether the end of the sample has been reached. If it is determined at block 310 that the end of the sample has not been reached, then operations may continue at block 315 described below, and the selected customer may be evaluated. If, however, it is determined at block 310 that the end of the sample has been reached, then operations of the method 300 may end. Accordingly, the method 300 may facilitate the evaluation of each of the customers included in the sample.

Although described herein as sequential evaluations, in certain embodiments, any number of customers may be evaluated in parallel.

At block 315, a pre-migration notice attrition risk may be calculated for the selected customer. A wide variety of suitable methods, techniques, algorithms, formulas, and/or models may be utilized as desired to calculate or determine a pre-notice attrition risk. Additionally, any number of suitable factors, predictors, and/or weightings may be utilized to calculate or determine the attrition risk. In certain embodiments, one or more predictive models may be invoked and/or utilized in order to determine an attrition risk for the customer. The attrition risk may be expressed, for example, as a probability or a score within an applicable range. The one or more predictive models utilized to evaluate the customer may be identified and/or selected based at least in part upon a wide variety of different factors, such as one or more customer attributes. As one example, a predictive model may be identified based upon the tenure of the customer with the financial institution. A few examples of predictive models that may be utilized are described in U.S. patent application Ser. No. 12/893,822, filed Sep. 29, 2010, and entitled "Systems and Methods for Customer Value Optimization Involving Product/Service Optimization," and in U.S. patent application Ser. No. 12/893,841, filed Sep. 29, 2010, and entitled "Systems and Methods for Customer Value Optimization Involving Relationship Optimization." Each of these applications is incorporated by reference herein in its entirety.

A wide variety of different types of techniques may be utilized as desired to generate or form predictive models, such as logistic regression models, neural network models, and/or other types of models. In certain embodiments, a model may be generated by evaluating historical data associated with financial institution customers, including historical data associated with customers that closed accounts with the financial institution. For example, historical data may be obtained from the core account systems of one or more financial institutions, and the historical data may be processed in order to generate an attrition model. The process of devising an attrition model may involve identifying one or more data attributes that provide a best indication of customer attrition and/or determining appropriate weightings of the attributes and/or relationships between the attributes. In this regard, customer values for the attributes may be provided to the model in order to predict customer attrition. As desired, a model may be specific to a particular financial institution or, alternatively, the model may have a scope that encompasses a plurality of financial institutions. Additionally, a model may be adjusted based upon the presence of new data. For example, a model may be periodically adjusted, or a model may be adjusted following the identification of a predetermined event.

Once generated, a predictive model may be utilized to evaluate data associated with a customer in order to determine an attrition risk associated with the customer. In certain embodiments, current data for a customer may be provided to a predictive model and/or formula in order to determine an attrition risk. As desired in other embodiments, current and/or historical account data for the customer, such as relatively recent transactional data for a predetermined past period, may be collected, and at least a portion of the historical account data may be provided to and/or run through a predictive model. In certain embodiments, data may be periodically obtained (e.g., once a day, once a week, once a month, etc.) from a financial institution system 115, and at least a portion of the data may be stored for subsequent evaluation utilizing the model. In other embodiments, data may be acquired in a "just-in-time" manner when desired for processing. The predictive model may be utilized to evaluate any number of components of the data including, but not limited to, an account balance, a sum of the balances of multiple accounts, increases and/or decreases in one or more account balances, percentage increases and/or decreases in one or more account balances, timing associated with account withdrawals, deposits and/or fees (e.g., a time since a last deposit or fee, etc.), credit extended to the customer, etc. In one example embodiment, the predictive model may identify and evaluate attributes of the data that have been determined to be significant indicators of attrition risk. In this regard, the predictive model may calculate an attrition risk for the customer. In certain embodiments, the predictive model may evaluate account activity patterns irrespective of the actual or potential incidence of fees. As a result of examining a variety of account relationships and activities other than simply the charging of fees, a predictive model may identify an attrition risk that may otherwise go undetected.

One example mathematical calculation that may be utilized to determine or calculate an attrition risk will now be described; however, a wide variety of other calculations may be utilized. Any number of predictors may be utilized in association with an attrition model and the mathematical calculation, such as the predictors set forth below:

TABLE 1

Example Predictors for an Attrition Risk Calculation

| Predictor | Predictor Range | Weight |
|---|---|---|
| Number of months since the first demand deposit account was opened - expressed as DD_OPEN_DT_F | .00 <= DD_OPEN_DT_F < 10.00 | 0.905 |
| | 10.00 <= DD_OPEN_DT_F < 24.00 | 0.478 |
| | 24.00 <= DD_OPEN_F < 62.00 | 0.369 |
| | 62.00 <= DD_OPEN_F <= 616.00 | 0.000 |
| % balance change between the beginning and end of an observation window - expressed as Bal_AMT_END_DD_INC | missing | 0.305 |
| | −184482001654159900.00 <= Bal_AMT_END_DD_INC < −0.11 | 0.155 |
| | −0.11 <= Bal_AMT_END_DD_INC < 0.04 | −0.177 |
| | 0.04 <= Bal_AMT_END_DD_INC <= 160148354953015700.00 | 0.000 |
| Number of months since the customer's last withdrawal of demand deposit account - expressed as DT_WITHDRW_MAX_DD_L | missing | −0.357 |
| | 0.00 <= DT_WITHDRW_MAX_DD_L < 1.00 | −0.585 |
| | 1.00 <= DT WITHDRW_MAX_DD_L <= 21.00 | 0.000 |
| Sum of customer's demand deposit account balances - expressed as BAL_AMT_dd_S | −44025.62 <= BAL_AMT_dd_S < 368.15 | 0.493 |
| | 368.15 <= BAL_AMT_dd_S < 1008.53 | 0.305 |
| | 1008.53 <= BAL_AMT_dd_S <= 291118.47 | 0.000 |

TABLE 1-continued

Example Predictors for an Attrition Risk Calculation

| Predictor | Predictor Range | Weight |
|---|---|---|
| NSF transaction indicator - expressed as TRAN_NSF_IND | TRAN_NSF_IND = 0 | −0.400 |
| | TRAN_NSF_IND = 1.00 | 0.000 |
| ACH debit change trend - expressed as tran_ACH_DEB_tre_max | Missing or Down | 0.200 |
| | Same or Up | 0.000 |
| Constant | | −2.804 |

A wide variety of other predictors and/or predictor ranges may be utilized as desired. Additionally, the illustrated weights for the predictors and predictor ranges are representative and, in certain embodiments, may be determined as a result of statistical modeling of historical data. As desired, the attrition risk for a customer may be calculated utilizing the predictor ranges set forth in Table 1 above, as well as customer values for the various predictors. For example, an attrition risk "P" (e.g., a risk that a customer will close an account, etc.) may be calculated in accordance with equation one (1) below:

$$P = \frac{\exp(F(X))}{(1 + \exp(F(X)))}$$

where $F(X) = -2.804 + 0.905 * \text{DD\_OPEN\_DT\_F\_bin}(1) +$ $0.478 * \text{DD\_OPEN\_DT\_F\_bin}(2) + 0.369 * \text{DD\_OPEN\_DT\_F\_bin}(3) +$ $0.305 * \text{Bal\_AMT\_END\_DD\_INC\_bin}(1) +$ $0.155 * \text{Bal\_AMT\_END\_DD\_INC\_bin}(2) -$ $0.177 * \text{Bal\_AMT\_END\_DD\_INC\_bin}(3) -$ $0.357 * \text{DT\_WITHDRW\_MAX\_DD\_L\_bin}(2) -$ $0.585 * \text{DT\_WITHDRW\_MAX\_DD\_L\_bin}(2) +$ $0.493 * \text{BAL\_AMT\_dd\_S\_bin}(1)\_0.305 * \text{BAL\_AMT\_dd\_S\_bin}(2) -$ $0.4 * (\text{TRAN\_NSF\_IND} = 0) + 0.2 * \text{tran\_ACH\_DEB\_tre\_max\_bin}(1).$ A wide variety of different formats may be utilized to represent a determined attrition risk. For example, an attrition risk may be represented as a probability value in the range of zero to one or as a score within some other range of possible values. In certain embodiments, once a pre-notice attrition risk has been determined for the customer, the determined pre-notice attrition risk may be stored. In this regard, the determined attrition risk may be utilized in association with subsequent processing for the customer.

At block 320, a determination may be made as to whether the calculated pre-notice attrition risk for the selected customer satisfies one or more pre-notice attrition risk thresholds, such as the first threshold described above with reference to block 210 of FIG. 2. In other words, prior to the communication of a migration notice to the selected customer, a determination may be made as to whether the attrition risk for the selected customer exceeds an acceptable level of risk specified by the financial institution (or a service provider). If it is determined at block 320 that the pre-notice attrition risk satisfies one or more pre-notice attrition risk thresholds, then operations may continue at block 325.

At block 325, the financial institution may transmit or direct the transmission of a product migration notice to the selected customer. A wide variety of suitable methods and/or techniques may be utilized to transmit the notice. For example, a notice may be transmitted via email, regular snail mail, short message service (SMS) messaging, automated phone messaging, and/or various "in-application" messaging via an online application (e.g., messaging via an online electronic banking application, messaging via an online EBPP application) or a dedicated application (e.g., a dedicated banking application, etc.). In certain embodiments, the financial institution may generate and transmit the product migration notice. For example, if the financial institution hosts electronic banking and/or EBPP services, the financial institution may generate and transmit the notice. In other embodiments, the financial institution may provide a generated notice to another entity for transmission, or the financial institution may direct or request another entity to generate and transmit the notice.

As desired in various embodiments, a wide variety of different types of information may be included in the generated migration notice and/or referenced by a migration notice (e.g., referenced by a hyperlink, etc.). Examples of suitable information that may be included in and/or referenced by the notice include, but are not limited to, an identification of a target product to which the customer has been assigned, one or more criteria associated with the target product (e.g., fee information, services associated with and/or encompassed by the target product, customer requirements associated with the target product, etc.), an identification of a current product that the customer is receiving, criteria associated with the current product, and/or a date (e.g., 30 days out, 60 days out, etc.) at which migration to the target product will occur. Once transmission of the migration notice has been directed at block 325, operations may continue at block 305, and a next customer may be selected from the sample for evaluation.

If, however, it is determined at block 320 that the pre-notice attrition risk fails to satisfy one or more pre-notice attrition risk thresholds, then operations may continue at block 330. As desired, prior to proceeding to block 330, the selected customer may be removed from the sample of customers. In this regard, the likelihood of customer attrition may be reduced. As desired in certain embodiments, various parameters associated with the customer may be reevaluated, and the customer may be assigned to a different target product. At block 330, a determination may be made as to whether the size of the sample should be increased in order to complete the product migration test. In other words, with the elimination of the customer from the sample, the size of the sample may be examined in order to determine whether it will still produce statistically significant results or otherwise function as an indicator associated with migration of a set of customers to the target product. In certain embodiments, the size of the sample may be compared to one or more threshold size values. In other embodiments, the size of the sample may be evaluated utilizing one or more statistical techniques in order to determine whether a desired confidence level can be achieved with respect to the sample. If it is determined at block 330 that the size of the sample does not need to be increased, then operations may continue at block 305, and another customer may be selected from the sample for evaluation.

If, however, it is determined at block 330 that the size of the sample should be increased, then operations may continue at block 335. At block 335, an additional customer may be selected from the set of customers assigned to the target product for inclusion in the sample. In certain embodiments, any customers previously selected for the sample (and/or any other samples in the event that products and/or assignments have been modified) may be excluded from the selection process. Operations may then continue at block 305, and another customer may be selected from the sample for evaluation. In this regard, pre-notice attrition risk may be evaluated for each of the customers included in the sample (or a modified sample).

Following the transmission of migration notices to the customers included in a sample of customers, a product migration test process may be utilized to conduct additional evaluations on the customers. For example, post-notice attrition risks may be determined or calculated for each of the customers included in the sample, and a determination may be made as to whether the attrition risks following transmission of the notices remain at an acceptable level. The post-notice evaluation process may be performed at any point in time following the transmission of the migration notices. For example, the post-notice evaluation process may be performed approximately 30 days to approximately 45 days (or at any other time interval) following the transmission of the notices. Additionally, in certain embodiments, the evaluation process may be performed prior to the migration date specified by the notices.

Figure 4:
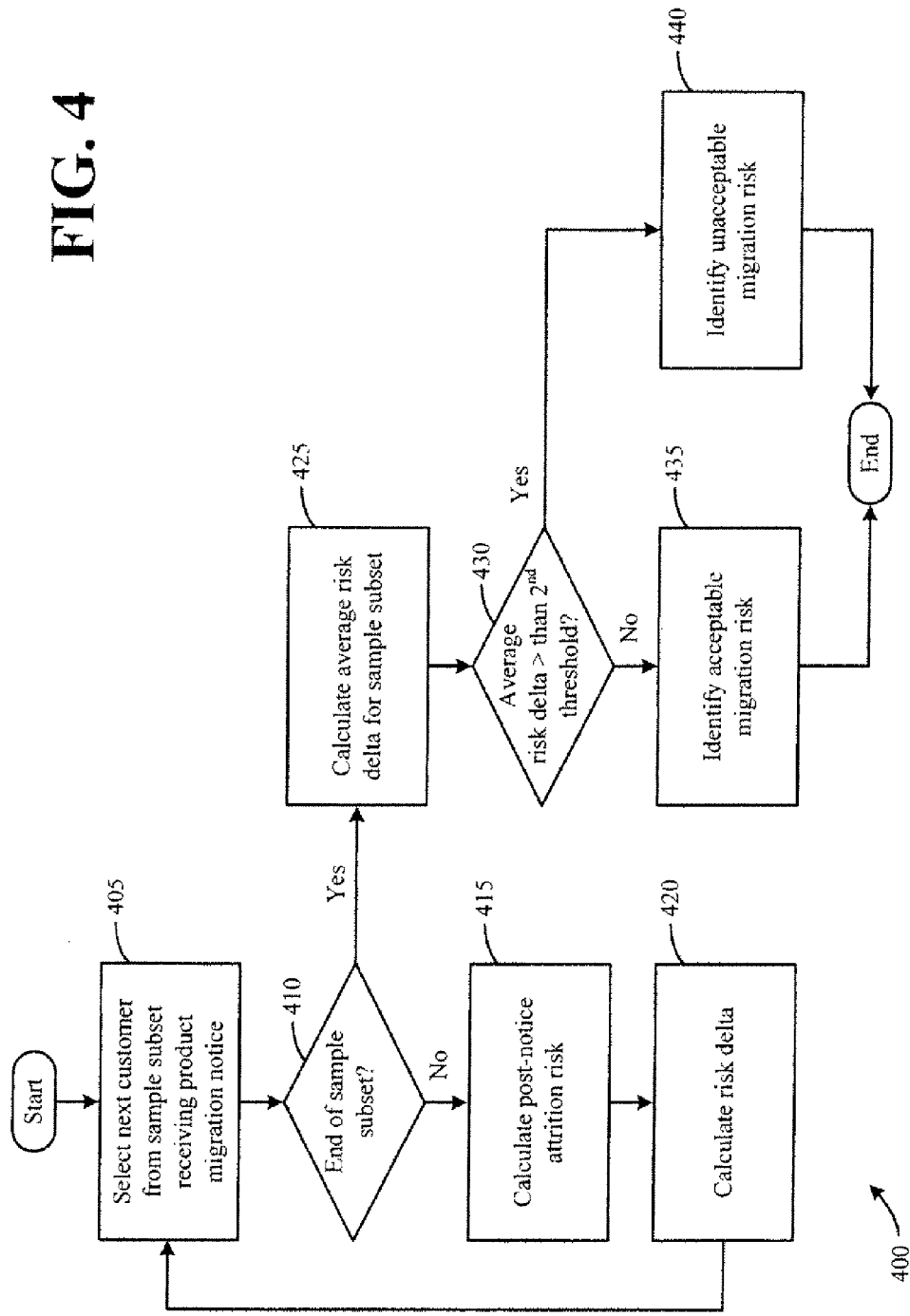
FIG. 4 illustrates a flow diagram of an example method for determining and evaluating post-migration notice attrition risks, according to an illustrative embodiment of the disclosure.

FIG. 4 illustrates a flow diagram of an example method 400 for determining and evaluating post-migration notice attrition risks, according to an illustrative embodiment of the disclosure. In certain embodiments, the determination and evaluation of post-notice attrition risks may be carried out when conducting a product migration test, such as the product migration test described with reference to block 230 of FIG. 2. As such, the method 400 may be performed by a suitable financial system and/or associated financial computers, such as the financial service provider system 105 and/or associated financial service provider computers 110 illustrated in FIG. 1, the financial institution system(s) 115 and/or financial institution computers 120 illustrated in FIG. 1, or the service provider system(s) 125 and/or service provider computers 130 illustrated in FIG. 1. The method 400 may begin at block 405.

At block 405, a sample of customers, such as a subset of customers assigned to a target product or alternative financial product, may be identified. The sample of customers may be a sample to which migration notices were previously transmitted. Additionally, at block 405, a next customer included in the sample or subset of customers may be selected for evaluation. At block 410, a determination may be made as to whether the end of the sample has been reached. If it is determined at block 410 that the end of the sample has not been reached, then operations may continue at block 415. At block 415, a post-notice attrition risk may be calculated for the selected customer. In certain embodiments, the post-notice attrition risk may be a current attrition risk for the selected customer. A wide variety of suitable methods, techniques, algorithms, formulas, and/or models may be utilized as desired to calculate or determine a post-notice attrition risk. In certain embodiments, these attrition risk calculation techniques may be similar to those described above with reference to block 315 illustrated in FIG. 3.

At block 420, a change in the attrition risk of the customer may be calculated or determined based at least in part upon the post-notice attrition risk and the previously determined pre-notice attrition risk for the selected customer. In one example embodiment, the pre-notice attrition risk may be accessed from memory or obtained from an external data source. The difference between the pre-notice attrition risk and the post-notice attrition risk for the customer may then be calculated or determined. In certain embodiments, the calculated difference may be referred to as a risk delta. Additionally, it should be noted that the difference between the pre-notice risk and the post-notice risk may either be positive or negative. In other words, the attrition risk may increase or decrease. Once the change in attrition risk for the customer is determined at block 420, operations may continue at block 405, and a next customer may be selected from the sample or subset for evaluation.

If, however, it is determined at block 410 that the end of the sample has been reached, then operations may continue at block 425. At block 425, an average risk delta for the subset may be calculated or determined as the sum of the respective risk deltas calculated for the various customers in the sample divided by the number of customers included in the sample. In other embodiments, a median risk delta or some other representative attrition risk may be determined. Alternatively, a wide variety of different types of attrition risks that are representative of the subset of customers may be calculated or determined.

At block 430, a determination may be made as to whether the average risk delta (or a representative attrition risk for the sample) satisfies one or more risk deltas or average change thresholds, such as the second threshold described above with reference to block 210 of FIG. 2. For example, a determination may be made as to whether the average risk delta exceeds a risk delta threshold. In this regard, based upon the product migration testing performed on a subset of a set of customers assigned to the target product, a determination may be made as to whether the entire set of customers should be migrated to the target product. If it is determined at block 430 that the average risk delta satisfies the one or more risk delta thresholds (e.g., the average risk delta does not exceed a risk delta threshold), then operations may continue at block 435. At block 435, the risk associated with a migration of the set of customers to the target product may be identified as an acceptable risk. If, however, it is determined at block 430 that the average risk delta does not satisfy one or more risk delta thresholds (e.g., the average risk delta exceeds a risk delta threshold), then operations may continue at block 440. At block 440, the risk associated with a migration of the set of customers to the target product may be identified as an unacceptable risk. Operations of the method 400 may end following either block 435 or block 440.

In addition to evaluating risks that are representative of a set of customers assigned to a target product (e.g., an average risk delta, etc.), in certain embodiments, market research may be performed for the sample or subset of customers for which product migration testing was conducted. For example, the results of customer questionnaires and/or surveys may be collected and evaluated in order to determine customer feedback and/or customer satisfaction associated with a product migration or a proposed product migration. As desired, the market research may be evaluated in order to determine whether a migration should be performed with respect to a target product.

Additionally, in certain embodiments, one or more predictive models or other desired calculation techniques may be utilized to identify or predict a respective future or expected value for each customer included in the sample or subset. Similarly, a respective revenue potential for each customer may be calculated. A future value or revenue potential may take a wide variety of different factors into account, such as expected interest income and/or expected fee income associated with migrating the customer to the target product. In certain embodiments, an expected value and/or revenue potential may be evaluated in conjunction with calculated attrition risks and/or risk deltas in order to determine whether to proceed with a migration of a set of customers from an existing financial product to an alternative or target financial product. Indeed, a wide variety of suitable evaluations may be performed in association with product migration testing in order to determine whether a full migration should be completed. Additionally, the results of one or more of these evaluations may be utilized to modify and/or optimize product parameters (or characteristics) and/or customer assignments.

In the event that an attrition risk associated with the migration of a set of customers to an alternative product is determined to be acceptable, a mass migration to the alternative product, which may be a modified or adjusted product, may be directed and/or performed by a financial system. In certain embodiments, an entity or system that conducts product migration testing may also perform and/or carry out the mass migration. For example, a financial institution system may perform product migration testing and a subsequent mass migration based upon a determination that a calculated attrition risk is acceptable. In other embodiments, the entity or system that conducts product migration testing may direct or request another entity to perform the mass migration. For example, a financial service provider may request a financial institution and/or another service provider system to perform the mass migration. In doing so, a wide variety of suitable information (e.g., alternative product definitions, customer assignment information, etc.) may be provided to the other entity.

Figure 5:
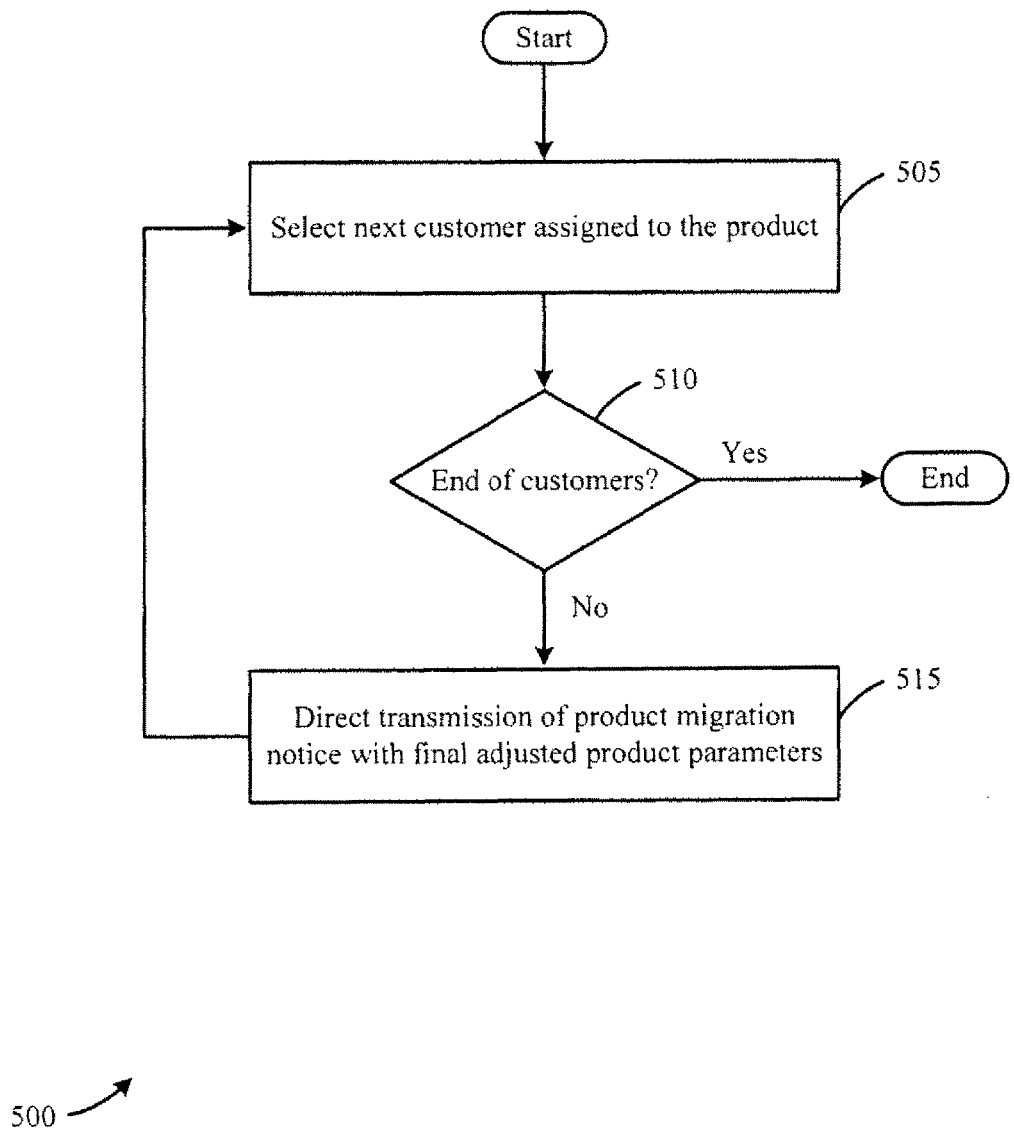
FIG. 5 illustrates a flow diagram of an example method for directing the transmission or communication of product migration notices, according to an illustrative embodiment of the disclosure.

FIG. 5 illustrates a flow diagram of an example method 500 for directing the transmission or communication of product migration notices, according to an illustrative embodiment of the disclosure. The communication or product migration notices may be performed during the execution of a product migration program or mass migration, such as the migration program discussed above with reference to block 250 of FIG. 2. The method 500 may be performed by any number of suitable systems and/or associated computers, such as the financial service provider system 105 and/or associated financial service provider computers 110 illustrated in FIG. 1, the financial institution system(s) 115 and/or financial institution computers 120 illustrated in FIG. 1, or the service provider system(s) 125 and/or service provider computers 130 illustrated in FIG. 1. The method 500 may begin at block 505.

At block 505, a set of customers assigned to an alternative or target product may be identified. Additionally, at block 505, a next customer included in the set of customers may be selected for evaluation and/or communication of a product migration notice. At block 510, a determination may be made as to whether the end of the set has been reached. If it is determined at block 510 that the end of the set has been reached, then operations may end. If, however, it is determined at block 510 that the end of the set has not been reached, then operations may continue at block 515.

At block 515, the transmission of a product migration notice to the selected customer may be directed and/or performed. As desired, if the selected customer was previously involved in a pre-migration test, then a product migration notice may not be transmitted to the selected customer. A wide variety of suitable methods and/or techniques may be utilized to transmit a notice. For example, a notice may be transmitted via email, regular snail mail, short message service (SMS) messaging, and/or various "in-application" messaging via an online application (e.g., messaging via an online electronic banking application, messaging via an online EBPP application) or a dedicated application (e.g., a dedicated banking application, etc.). In certain embodiments, a financial institution may generate and transmit the product migration notice. For example, if the financial institution hosts electronic banking and/or EBPP services, the financial institution may generate and transmit the notice. In other embodiments, the financial institution may provide a generated notice to another entity for transmission, or the financial institution may direct or request another entity to generate and transmit the notice.

As desired in various embodiments, a wide variety of different types of information may be included in the generated migration notice. Examples of suitable information that may be included in the notice include, but are not limited to, an identification of a target product to which the selected customer will be migrated, one or more criteria associated with the target product (e.g., fee information, services associated with and/or encompassed by the target product, customer requirements associated with the target product, etc.), an identification of a current product that the customer is receiving, criteria associated with the current product, and/or a date (e.g., 30 days out, 60 days out, etc.) at which migration to the target product will occur. Once transmission of the migration notice has been directed at block 515, operations may continue at block 505, and a next customer may be selected from the set of customers for evaluation and notice transmission.

Additionally, although the sequential transmission of migration notices is described, in certain embodiments, any number of migration notices may be transmitted in parallel. In other embodiments, migration notices may be selectively transmitted based upon predetermined events. For example, when a customer logs into an electronic banking application, a product migration notice may be transmitted to a customer device.

Figure 6:
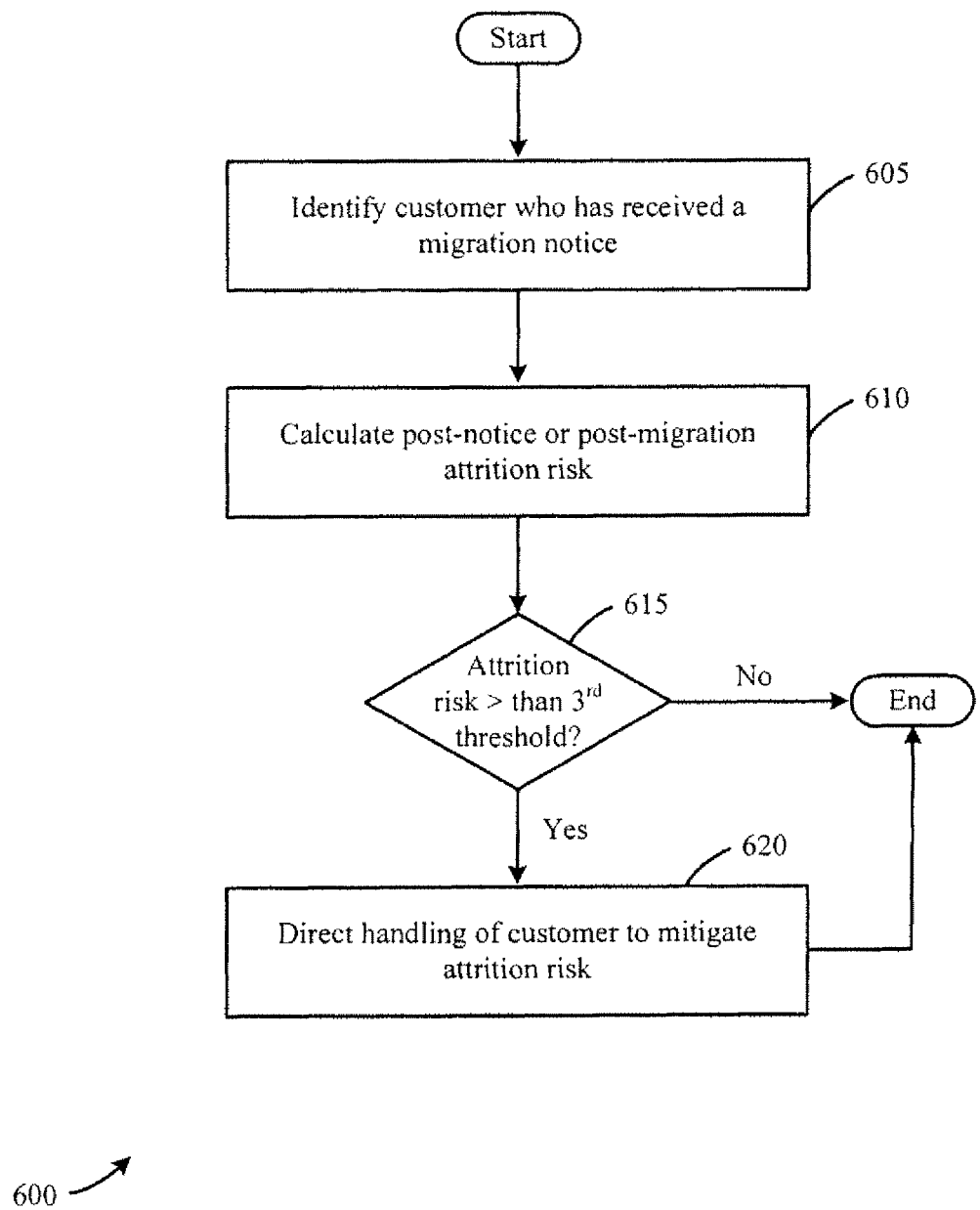
FIG. 6 illustrates a flow diagram of an example method for conducting risk mitigation in association with a product migration, according to an illustrative embodiment of the disclosure.

In certain embodiments, following the transmission of a product migration notice to a customer, a wide variety of different types of post-notice and/or post-migration processing may be performed with respect to the customer. In this regard, a determination may be made as to whether attrition mitigation should be performed on behalf of the customer. FIG. 6 illustrates a flow diagram of an example method 600 for conducting risk mitigation in association with a product migration, according to an illustrative embodiment of the disclosure. The method 600 may be performed by any number of suitable systems and/or associated computers, such as the financial service provider system 105 and/or associated financial service provider computers 110 illustrated in FIG. 1, the financial institution system(s) 115 and/or financial institution computers 120 illustrated in FIG. 1, or the service provider system(s) 125 and/or service provider computers 130 illustrated in FIG. 1. The method 600 may begin at block 605.

At block 605, a customer who has previously received a product migration notice may be identified. In certain embodiments, the customer may be identified subsequent to the transmission of a migration notice and prior to migration. In other embodiments, the customer may be identified subsequent to a migration. A wide variety of suitable methods and/or techniques may be utilized as desired in various embodiments to identify a customer for evaluation. For example, various customers may be periodically evaluated and/or evaluated in accordance with a predetermined schedule. As another example, customers may be randomly selected for evaluation following the transmission of migration notices to a set of customers. As yet another example, a relatively high value customer may be identified for evaluation. As yet another example, a customer may be identified in response to certain customer behavior. In other words, a determination may be made that a customer has exhibited a particular kind of behavior, and the customer may be identified for evaluation based at least in part upon the determination. As one example, the customer may be identified in the event that the customer has requested closure of an account or if the customer has provided a negative review and/or complaint associated with an alternative financial product.

Once a customer has been identified at block 605, operations may continue at block 610. At block 610, a post-notice or post-migration attrition risk may be calculated for the identified customer. In certain embodiments, the post-notice or post-migration attrition risk may be a current attrition risk for the customer. A wide variety of suitable methods, techniques, algorithms, formulas, and/or models may be utilized as desired to calculate or determine a post-notice or post-migration attrition risk. In certain embodiments, these attrition risk calculation techniques may be similar to those described above with reference to block 315 illustrated in FIG. 3.

At block 615, a determination may be made as to whether the calculated post-notice or post-migration attrition risk for the identified customer exceeds one or more attrition risk thresholds associated with attrition mitigation, such as the third threshold described above with reference to block 210 of FIG. 2. In other words, a determination may be made as to whether the current attrition risk of the customer qualifies the customer for one or more risk mitigation activities. For example, a determination may be made as to whether the current attrition risk exceeds a threshold associated with attrition mitigation. Additionally, in certain embodiments, other attributes associated with the customer, such as a customer value, a customer segmentation, and/or expected revenue associated with the customer, may be evaluated in order to determine whether attrition mitigation should be performed.

If it is determined at block 615 that the attrition risk does not exceed one or more thresholds associated with attrition mitigation, then operations may end. If, however, it is determined at block 615 that the attrition risk exceeds one or more thresholds associated with attrition mitigation, then operations may continue at block 620. At block 620, any number of customer handling processes may be invoked and/or directed in order to mitigate the attrition risk associated with the customer. The customer handling processes may include any number of automated processes, human-driven or manual processes, and/or any combination of automated and manual processes. In this regard, an attempt to retain the customer may be carried out. Additionally, as set forth above, other customer attributes and/or customer information may be analyzed (e.g., customer value, etc.) in order to determine whether customer retention is desired.

A wide variety of attrition mitigation and/or retention procedures and/or techniques may be utilized as desired in various embodiments of the invention. For example, the customer may be assigned to a different financial product, such as a financial product that will result in a lower attrition risk for the customer. As another example, one or more parameters of a financial product to which the customer is assigned may be modified. In this regard, a product may be tailored for the customer. As yet another example, one or more special offers and/or discounts may be offered to the customer. Other procedures and/or techniques will be appreciated. Operations may then end following the performance of one or more attrition mitigation procedures at block 620. As desired, an identifier of the customer may be stored to facilitate a subsequent evaluation of the customer. In this regard, the effectiveness of the mitigation procedure(s) may be evaluated.

The operations described and shown with reference to the above methods may be carried out or performed in any suitable order as desired in various embodiments of the invention. Additionally, in certain embodiments, at least a portion of the operations may be carried out in parallel. Furthermore, in certain embodiments, less than or more than the operations described herein may be performed.

Various embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatuses to produce a particular machine, such that the instructions that execute on the computer, processor, or other programmable data processing apparatus create means for implementing one or more functions specified in the flow diagram block or blocks. A special-purpose computer may be a general-purpose computer that is programmed to perform one or more of the steps discussed herein. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-readable medium having one or more computer-readable programs comprising code or program instructions embodied therein, wherein said one or more computer-readable programs, upon execution, implement one or more functions specified in the flow diagram block or blocks. The computer program instructions may also be loaded onto a computer or other programmable data processing apparatus to cause a series of operational elements or steps to be performed on the computer, or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   identifying, by a computerized financial system comprising one or more computers, a target financial product offered by a financial institution;
   identifying, by the computerized financial system, one or more customers of the financial institution eligible for a migration to the target financial product, wherein each of the one or more customers is not currently associated with the target financial product;
   determining, by the computerized financial system, a migration risk metric indicative of an impact of the migration of the one or more customers to the target financial product, wherein determining the migration risk metric comprises deriving the migration risk metric based at the least in part on a respective plurality of attrition risk values associated with each of at least one customer of the one or more customers;
   determining, by the computerized financial system, a risk threshold value associated with the migration of the one or more customers to the target financial product;
   determining, by the computerized financial system, that the migration risk metric exceeds the risk threshold value;
   modifying, by the computerized financial system and responsive to determining that the migration risk metric exceeds the risk threshold value, one or more characteristics associated with the target financial product to generate a modified target financial product;
   determining, by the computerized financial system and responsive to generation of the modified target financial product, a modified migration risk metric associated with a migration of the one or more customers to the modified target financial product;
   determining, by the computerized financial system, that the modified migration risk metric does not exceed the risk threshold value; and
   directing, by the computerized financial system and responsive to determining that the modified migration risk metric does not exceed the risk threshold value, the migration of the one or more customers to the modified target financial product.

2. The method of claim 1, wherein the one or more customers comprise a plurality of customers, and wherein determining the migration risk metric comprises:
   identifying, by the computer financial system, a subset of one or more customers of the plurality of customers;
   conducting, by the computerized financial system, a pre-migration test for the identified subset; and
   determining, by the computerized financial system, the migration risk metric based at least in part upon the pre-migration test.

3. The method of claim 2, wherein conducting a pre-migration test comprises:
   directing, by the computerized financial system, communication of the set of one or more migration notices, wherein each migration notice is communicated to a respective customer including in the subset;
   determining, by the computerized financial system, prior to the communication of the set of one or more migration notices, a respective pre-notice attrition risk value for each customer included in the subset;
   determining, by the computerized financial system, subsequent to communication of the set of one or more migration notices, a respective post-notice attrition risk value for each customer included in the subset; and
   determining, by the computerized financial system, the migration risk metric associated with the migration based at the least in part upon at least one respective pre-notice attrition risk value and at least one respective post-notice attrition risk value.

4. The method of claim 3, wherein each of at least one migration notice in the set of one or more migration notices comprises a respective at least one of (i) an identification of the target financial product, (ii) an indication of the one or more characteristics associated with the target financial product, or (iii) a migration date.

5. The method of claim 3, wherein determining the migration risk metric associated with the migration comprises:
   determining, by the computerized financial system for each customer included in the subset, a respective difference between the respective pre-notice attrition risk value and the respective post-notice attrition risk value corresponding to the customer; and
   determining, by the computerized financial system, a statistical value indicative of a change in attrition risk associated with the subset based at least in part on each respective difference,
   wherein the migration risk metric associated with the migration of the one or more customers to the target financial product comprises the statistical value and the risk threshold value is indicative of a threshold change in attrition risk permitted for the migration of the one or more customers to the target financial product.

6. The method of claim 5, wherein the statistical value is an average of the one or more respective differences.

7. The method of claim 3, further comprising:
   determining, by the computerized financial system, that the respective pre-notice attrition risk value for a particular customer included in the subset to satisfy a pre-notice threshold value; and
   removing, by the computerized financial system, the particular customer for the subset responsive to determining that the respective pre-notice attrition risk value for the particular customer fails to satisfy the pre-notice threshold value.

8. The method of claim 7, further comprising:
   determining, by the computerized financial system and subsequent to removing the particular customer from the subset, that a size of the subset fails to satisfy a size threshold; and
   selecting, by the computerized financial system and responsive to determining that the size of the subset fails to satisfy the size threshold, one or more additional customers from the plurality of customers for inclusion in the subset.

9. The method of claim 1, wherein directing the migration comprises directing the communication of a set of one or more migration notices, wherein each migration notice is communicated to a respective corresponding customer included in the one or more customers.

10. The method of claim 9, further comprising:
determining, by the computerized financial system and subsequent to the communication of the set of one or more migration notices, a post-notice attrition risk value for a particular customer included in the one or more customers;
determining, by the computerized financial system, that the post-notice attrition risk value for the particular customer fails to satisfy a post-notice threshold value; and
directing, by the computerized financial system and responsive to determining that the post-notice attrition risk value fails to satisfy the post-notice threshold value, initiation of an attrition risk mitigation process with respect to the particular customer.

11. The method of claim 10, further comprising:
determining, by the computerized financial system and based at least in part upon historical information associated with one or more customer accounts, a customer value metric indicative of a value of the particular customer to the financial institution; and
determining, by the computerized financial system, that the customer value metric satisfies a customer value threshold,
wherein directing initiation of the attrition risk process comprises directing initiation of the attrition risk process further responsive to determining that the customer value metric satisfies the customer value threshold.

12. The method of claim 1, wherein identifying the one or more customers comprises:
determining, by the computerized financial system, that a respective set of one or more characteristics associated with each customer included in the one or more customers satisfies one or more qualification criteria associated with the target financial product.

13. The method of claim 1, further comprising:
determining, by the computerized financial system, that a particular customer included in the set of one or more customers is eligible for migration to a plurality of candidate target financial products including the target financial product; and
selecting, by the computerized financial system, the target financial product based at least in part upon at least one of (i) a determination that the target financial product is a best fit for the particular customer, (ii) a determination that the target financial product will maximize financial institution revenue, or (iii) a determination that the target financial product will minimize attrition risk associated with the particular customer.

14. The method of claim 1, wherein the target financial product is included among a plurality of financial products available for migration.

15. The method of claim 14, wherein modifying one or more characteristics associated with the target financial product comprises replacing the target financial product with another financial product included in the plurality of financial products available for migration.

16. The method of claim 1, wherein modifying one or more characteristics comprises modifying at least one of (i) a price associated with the target financial product, (ii) one or more services associated with the target financial product, or (iii) one or more customer requirements associated with the target financial product.

17. The method of claim 1, further comprising:
replacing, by the computerized financial system and responsive to determining that the migration risk metric exceeds the risk threshold value, at least one customer included in the one or more customers with at least one alternative customer.

18. A system, comprising:
at least one memory storing computer-executable instructions; and
at least one processor configured to access the at least one memory and execute the computer-executable instructions to:
identify a target financial product offered by a financial institution;
identify one or more customers of the financial institution eligible for a migration to the target financial product, wherein each of the one or more customers is not currently associated with the target financial product;
determine a migration risk metric associated with the migration of the one or more customers to the target financial product, wherein the at least one processor is configured to determine the migration risk metric by executing the computer-executable instructions to derive the migration risk metric based at least in part on a respective plurality of attrition risk values associated with each of at least one customer of the one or more customers;
determine a risk threshold value associated with the migration of the one or more customers to the target financial product;
determine that the migration risk metric exceeds the risk threshold value;
modify, responsive to the determination that the migration risk metric exceeds the risk threshold value, one or more characteristics associated with the target financial product to generate a modified target product;
determine, responsive to generation of the modified target financial product, a modified migration risk metric associated with a migration of the one or more customers to the modified target financial product;
determine that the modified migration risk metric does not exceed the risk threshold value; and
direct the migration of the one or more customers to the modified target financial product responsive to the determination that the modified migration risk metric does not exceed the risk threshold value.

19. The system of claim 18, wherein the one or more customers comprise a plurality of customers, and wherein the at least one processor is configured to determine the migration risk metric by executing the computer-executable instructions to:
identify a subset of one or more customers of the plurality of customers;
conduct a pre-migration test for the identified subset; and
determine the migration risk based at least in part upon the pre-migration test.

20. The system of claim 19, wherein the at least one processor is configured to conduct the pre-migration test by executing the computer-executable instructions to:
direct communication of a set of one or more migration notices, wherein each migration notice is communicated to a respective customer included in the subset;
determine, prior to communication of the set of one or more migration notices, a respective pre-notice attrition risk value for each customer included in the subset;

determine, subsequent to communication of the set of one or more migration notices, a respective post-notice attrition risk value for each customer included in the subset; and determine the migration risk metric associated with the migration based at least in part upon at least one respective pre-notice attrition risk value and at least one respective post-notice attrition risk value.

21. The system of claim 20, wherein the at least one processor is configured to determine the migration risk metric by executing the computer-executable instructions to:

determine, for each customer included in the subset, a respective difference between the respective pre-notice attrition risk value and the respective post-notice attrition risk corresponding to the customer; and determine a statistical value indicative of a change in attrition risk associated with the subset based at least in part on each respective difference, wherein the migration risk metric associated with the migration of the one or more customers to the target financial product comprises the statistical value and the risk threshold value is indicative of a threshold change in attrition risk permitted for the migration of the one or more customers to the target financial product.

22. The system of claim 21, wherein the statistical value is an average of the one or more respective differences.

23. The system of claim 20, wherein the at least one processor is further configured to execute the computer-executable instructions to:

determine that the respective pre-notice attrition risk value for a particular customer included in the subset fails to satisfy a pre-notice threshold value; and remove the particular customer from the subset responsive to determining that the respective pre-notice attrition risk value for the particular customer fails to satisfy the pre-notice threshold value.

24. The system of claim 23, wherein the at least one processor is further configured to execute the computer-executable instructions to:

determine, subsequent to removal of the particular customer from the subset, that a size of the subset fails to satisfy a size threshold; and select, responsive to determination that the size of the subset fails to satisfy the size threshold, one or more additional customers from the plurality of customers for inclusion in the subset.

25. The system of claim 18, wherein the at least one processor is configured to indentify the one or more customers by executing the computer-executable instructions to:

determine that a respective set of one or more characteristics associated with each customer included in the one or more customers satisfies one or more qualification criteria associated with the target financial product.

26. The system of claim 25, wherein the at least one processor is further configured to execute the computer-executable instructions to:

determine that a particular customer included in the one or more customers is eligible for migration to a plurality of candidate financial products including the target financial product; and select the target financial product based at least in part upon at least one of (i) a determination that the target financial product is a best fit for the particular customer, (ii) a determination that the target financial product will maximize financial institution revenue, or (iii) a determination that the target financial product will minimize attrition risk associated with the particular customer.

27. The system of claim 18, wherein the one or more characteristics comprise at least one of (i) a price associated with the target financial product, (ii) one or more services associated with the target financial product, or (iii) one or more customer requirements associated with the target financial product.

28. The system of claim 18, wherein the at least one processor is further configured to execute the computer-executable instructions to:

direct the communication of a set of one or more migration notices, wherein each migration notice is communicated to a respective corresponding customer included in the one or more customers;

determine, subsequent to the communication of the set of one or more migration notices, a post-notice attrition risk value for a particular customer included in the one or more customers;

determine that the post-notice attrition risk value for the particular customer fails to satisfy a post-notice threshold value; and direct, responsive to the determination that the post-notice attrition risk value fails to satisfy the post-notice threshold value, initiation of an attrition risk mitigation process with respect to the particular customer.

29. The system of claim 28, wherein the at least one processor is further configured to execute the computer-executable instructions to:

determine, based at least in part upon historical information associated with one or more customer accounts, a customer value metric indicative of a value of the particular customer to the financial institution; and determine that the customer value metric satisfies a customer value threshold, wherein the at least one processor is configured to direct initiation of the attrition risk process further responsive to determining that the customer value metric satisfies the customer value threshold.

30. The system of claim 18, wherein the one or more characteristics associated with the target financial product comprise at least one of: (i) a price associated with the target financial product, (ii) one or more services associated with the target financial product, or (iii) one or more customer requirements associated with the target financial product.

* * * * *